US006928399B1

(12) United States Patent
Watts, III et al.

(10) Patent No.: US 6,928,399 B1
(45) Date of Patent: Aug. 9, 2005

(54) METHOD AND PROGRAM FOR SIMULATING A PHYSICAL SYSTEM USING OBJECT-ORIENTED PROGRAMMING

(75) Inventors: James W. Watts, III, Houston, TX (US); Glenn O. Morrell, Jr., Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 918 days.

(21) Appl. No.: 09/712,567

(22) Filed: Nov. 14, 2000

Related U.S. Application Data

(60) Provisional application No. 60/168,887, filed on Dec. 3, 1999.

(51) Int. Cl.[7] ............................................... G06F 19/00
(52) U.S. Cl. ...................... 703/2; 703/9; 702/7; 702/13
(58) Field of Search ............................... 703/2, 7, 9, 5, 703/10; 702/7, 13; 717/116; 345/420, 428

(56) References Cited

U.S. PATENT DOCUMENTS

| | | | |
|---|---|---|---|
| 4,210,964 A | 7/1980 | Rogers et al. | 364/578 |
| 5,202,981 A | 4/1993 | Shackelford | 395/600 |
| 5,307,445 A | 4/1994 | Dalal et al. | 395/66 |
| 5,428,744 A | 6/1995 | Webb et al. | 395/164 |
| 5,499,371 A | 3/1996 | Henninger et al. | 395/700 |
| 5,684,723 A | 11/1997 | Nakadai | 364/578 |
| 5,710,726 A | 1/1998 | Rowney et al. | 364/578 |
| 5,794,005 A | 8/1998 | Steinman | 395/500 |
| 5,875,285 A | 2/1999 | Chang | 395/62 |
| 5,905,657 A | 5/1999 | Celniker | 364/578 |
| 5,913,051 A | 6/1999 | Leeke | 395/500 |
| 5,914,891 A | 6/1999 | McAdams et al. | 364/578 |
| 5,923,867 A | 7/1999 | Hand | 395/500 |
| 5,953,239 A | 9/1999 | Teixeira et al. | 364/578 |
| 5,963,212 A | 10/1999 | Bakalash | 345/424 |
| 6,052,520 A | 4/2000 | Watts, III | 395/500.31 |
| 6,052,650 A | 4/2000 | Assa et al. | 702/14 |
| 6,078,869 A * | 6/2000 | Gunasekera | 702/6 |
| 6,108,608 A | 8/2000 | Watts, III | 702/30 |
| 6,128,577 A | 10/2000 | Assa et al. | 702/2 |
| 6,256,603 B1 * | 7/2001 | Celniker | 703/10 |
| 6,373,489 B1 * | 4/2002 | Lu et al. | 345/428 |
| 6,662,146 B1 * | 12/2003 | Watts | 703/10 |

FOREIGN PATENT DOCUMENTS

WO    WO 99/53342    10/1999

OTHER PUBLICATIONS

Palagi, C.L. and Aziz, K.: "Use of Voronoi Grid in Reservoir Simulation," SPE 22889, 66th Annual Technical Conference and Exhibition, Dallas, Texas, Oct. 6–9, 1991.

J.W. Watts, "Reservoir Simulation: Past, Present and Future," SPE 38441, 1997 SPE Reservoir Simulation Symposium, Dallas, Texas, Jun. 8–11, 1997.

Z.E. Heinemann, et al., "Modeling Reservoir Geometry with Irregular Grids", SPE Reservoir Engineering, May 1991.

Verma, S., et al., "A Control Volume Scheme for Flexible Grids in Reservoir Simulation," SPE 37999, SPE Reservoir Simulation Symposium, Dallas, Texas Jun. 1997.

(Continued)

Primary Examiner—Thai Phan

(57) ABSTRACT

The invention relates to an object-oriented method for simulating a property of at least one fluid in a fluid-containing physical system in which the physical system is represented by a multiplicity of volumetric cells and a multiplicity of connections between cells. The method uses cell-group objects and connection-group objects in the simulation. The invention can optionally comprise additional objects such as an object containing the entire model of the simulation and another object containing a portion of the entire model.

31 Claims, 15 Drawing Sheets

OTHER PUBLICATIONS

Mattax, C. C. and Dalton, R. L., *Reservoir Simulation*, vol. 13, Society of Petroleum Engineers, Chapter 6, pp. 57–73, 1990.

Aziz, K. and Settari, A., *Petroleum Reservoir Simulation*, Applied Science Publishers Ltd, Barking, Essex, England, Chapter 4, pp. 113–124, 1979.

D. W. Peaceman, *"Fundamentals of Numerical Reservoir Simulation,"* Elsevier, New York, Chapter 3, pp. 45–64, 1977.

K. T. Lim, D. J. Schiozer, K. Aziz, "A New Approach for Residual and Jacobian Array Construction in Reservoir Simulators," SPE 28248 presented at the 1994 SPE Petroleum Computer Conference, Dallas, Texas, Jul. 31–Aug. 3, 1994.

Luksch, P. et al., "Software Engineering in Parallel and Distributed Scientific Computing: A Case Study from Industrial Practice," AEA Technology GmbH IEEE, pp. 187–197, 1998.

Silver, D., "Object Oriented Visualization," Rutgers University IEEE, pp. 54–60, 1995.

Sabella, P. and Carlbom, I., "Scientific Visualization: An Object Oriented Approach to the Solid Modeling of Empirical Data," IEEE Computer Graphics and Applications, 1989.

Zhuang, X. and Jianping, Z., "Parallelizing a Reservoir Simulator Using MPI," IEEE Mississippi State University, pp. 165–174, 1995.

Silver D. and Wang, X. "Tracking Scalar Features in Unstructured Datasets," IEEE Rutgers University, pp. 79–86, 521, 1998.

Byer, T. J. et al, "Preconditioned Newton Methods for Fully Coupled Reservoir and Surface Facility Models", SPE 49001, Sep. 27, 1998, pp. 181–188.

Farkas, Eva, "Linearization Techniques of Reservoir Simulation Equations: Fully Implicit Cases", SPE 37984, Jun. 8, 1997, pp. 87–95.

Trick, M. D., "A Different Approach to Coupling a Reservoir Simulator with a Surface Facilities Model", Mar. 15, 1998, pp. 285–290.

Supplementary Partial European Search Report for corresponding application in the European Patent Office, May 26, 2003.

* cited by examiner

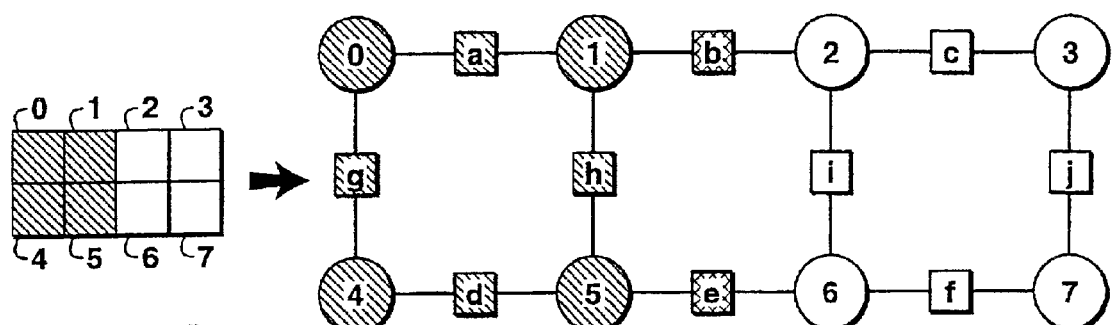
FIG. 8A
FIG. 8B
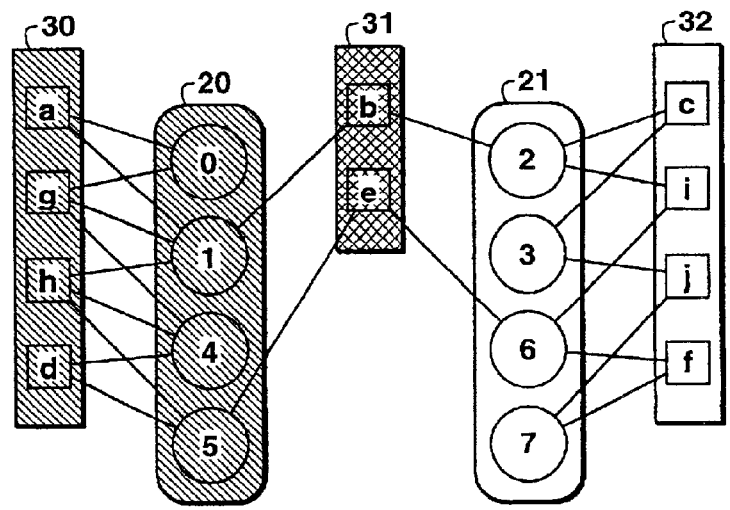
FIG. 9

METHOD AND PROGRAM FOR SIMULATING A PHYSICAL SYSTEM USING OBJECT-ORIENTED PROGRAMMING

This application claims the benefit of U.S. Provisional Application No. 60/168,887 filed on Dec. 3, 1999.

FIELD OF THE INVENTION

This invention relates to a method of simulating at least one characteristic of a physical system using object-oriented programming. In one aspect, the invention relates to a method for simulating fluid flow and transport in a physical system that includes, but is not limited to, at least part of a hydrocarbon-bearing formation. The method is particularly useful for parallel computing in reservoir simulation.

BACKGROUND OF THE INVENTION

Numerical simulation is widely used in industrial fields as a method of simulating a physical system by using a computer. In most cases, there is desire to model the transport processes occurring in the physical system. What is being transported is typically mass, energy, momentum, or some combination thereof. By using numerical simulation, it. is possible to model and observe a physical phenomenon and to determine design parameters, without actual laboratory experiments and field tests.

Reservoir simulation is of great interest because it infers the behavior of a real hydrocarbon-bearing reservoir from the performance of a model of that reservoir. The typical objective of reservoir simulation is to understand the complex chemical, physical, and fluid flow processes occurring in the reservoir sufficiently well to predict future behavior of the reservoir to maximize hydrocarbon recovery. Reservoir simulation often refers to the hydrodynamics of flow within a reservoir, but in a larger sense reservoir simulation can also refer to the total hydrocarbon system which can include not only the reservoir, but also injection wells, production wells, surface flowlines, associated aquifers, and surface processing facilities. Reservoir simulation calculations in such hydrocarbon systems are based on fluid flow through the entire hydrocarbon system being simulated. These calculations are performed with varying degrees of rigor, depending on the requirements of the particular simulation study and the capabilities of the simulation software being used.

The principle of numerical simulation is to numerically solve equations describing a physical phenomenon using a computer. Such equations are generally ordinary differential equations and partial differential equations. As a means for numerically solving such equations, there are known the finite element method, the finite difference method, the finite volume method, and the like. Regardless of which method is used, the physical system to be modeled is divided into cells (a set of which is called a grid or mesh), and the state variables that vary in space throughout the model are represented by sets of values for each cell. The reservoir rock properties such as porosity and permeability are typically assumed to be constant inside a cell. Other variables such as fluid pressure and phase saturation are specified at specified points, sometimes called nodes, within the cell. A link between two nodes is called a "connection." Fluid flow between two cells is typically modeled as flow along the connection between them.

Since the reservoir simulation can include vastly different fluid flow environments (e.g., porous rock, well tubing, processing facilities), the set of cells can include multiple segments of different flow enviroments. Although individual segments, such as production facilities and surface pipe segments, could be represented by single cells, at times reservoir simulation programs subdivide such segments into multiple cells.

A set of equations is developed to express the fundamental principles of conservation of mass, energy, and/or momentum within each cell and of movement of mass, energy, and/or momentum between cells. These equations can number in the millions. The replacement of state variables that vary in space throughout a model by a finite number of variable values for each cell is called "discretization". In order to analyze a phenomenon changing in time, it is necessary to calculate physical quantities at discrete intervals of time called timesteps, irrespective of the continuously changing conditions as a function of time. Time-dependent modeling of the transport processes therefore proceeds in a sequence of timesteps.

During a timestep, transport of various kinds occurs between cells. Through this transport, a cell can exchange mass, momentum, or energy with other nearby cells. In the porous medium of a subterranean reservoir, mass and momentum transport are computed using Darcy's law. In production tubing in a wellbore, mass and momentum transport calculations can be performed using well known methods to describe multiphase turbulent flow. Energy can be convected in the moving fluids, and it can be conducted through the reservoir rock. In some cases, energy transport by radiation is also considered. It is also sometimes desirable to consider chemical reactions that lead to creation or consumption of mass and energy in a cell during a timestep.

The equations governing the behavior of each cell during a timestep couple the mass, momentum, and energy conservation principles to the transport calculations. These equations can assume either an unsteady state or a pseudo-steady state transport process. If they assume an unsteady state process, a conservation principle can be expressed as

| Amount in cell at end of timestep | = Amount in cell at beginning of timestep | + Net amount transported into cell during timestep | + Net amount created in cell during timestep |
| --- | --- | --- | --- |

If pseudo-steady state is assumed, the conservation principle can be expressed as

| Net amount transported into cell during timestep | + Net amount created in cell during timestep | = 0 |
| --- | --- | --- |

At every timestep, the simulator must solve one or more large matrix equations, with the number depending on the type of timestep computation method being used. Because matrix equations are quite large (at least one equation per cell), they are solved iteratively except in small models.

Various timestep computations have been proposed for reservoir simulation. Two commonly used calculation methods are called "IMPES" and "fully implicit." In the IMPES method, which is derived from the term "implicit-pressure, explicit-saturation," flows between neighboring cells are computed based on pressures at their values at the end of the timestep and saturations at their values at the beginning of the timestep. The pressures at the end of the IMPES timestep are interdependent and must be determined simultaneously. This method is called "implicit" because each pressure depends on other quantities (for example, other pressures at the end of the timestep) that are known only implicitly. The basic procedure is to form a matrix equation that is implicit in pressures only, solve this matrix equation for the pressures, and then use these pressures in computing saturations explicitly cell by cell. In this fashion, after the pressures have been advanced in time, the saturations are updated explicitly. After the saturations are calculated, new relative permeabilities and capillary pressures can be calculated; these are explicitly used at the next timestep. Similar treatment can be used for other possible solution variables such as concentrations, component masses, temperature, or internal energy.

The fully implicit method trets both pressure and saturations implicitly. Flow rates are computed using phase pressures and saturations at the end of each timestep. The calculation of flow rates, pressure, and saturation involves the solution of nonlinear equations using a suitable iterative technique. At each iteration, the method constructs and solves a matrix equation, the unknowns of which (pressure and saturation) change over the iteration. As the pressures and saturations are solved, the updating of these terms continues using new values of pressure and saturation. The iteration process terminates when predetermined convergence criteria are satisfied.

IMPES consumes relatively little computer time per timestep, but in some simulations its stability limitations cause it to use a large number of small timesteps. The result can be a large computing cost. The fully implicit method consumes more computing time than IMPES per timestep, but it can take much larger timesteps.

In many reservoir simulations, implicit computations are needed for only a small percentage of cells. Simulation programs have been proposed to perform both IMPES and fully implicit calculations. This makes it possible to use the fully implicit method's long timesteps while decreasing the computational cost per timestep.

Additional information about reservoir simulation and computation techniques can be found in:

(1) U.S. patent application Ser. No. 60/074188 by J. W. Watts, entitled "Improved Process for Predicting Behavior of a Subterranean Formation";

(2) Mattax, C. C. and Dalton, R L., *Reservoir Simulation, Monograph* Volume 13, Society of Petroleum Engineers, 1990;

(3) Aziz, K. and Settari, A., *Petroleum Reservoir Simulation*, Applied Science Publishers Ltd, Barking, Essex, England, 1979;

(4) D. W. Peaceman, "Fundamentals of Numerical Reservoir Simulation," Elsevier, N.Y., 1977;

(5) J. W. Watts, "Reservoir Simulation: Past, Present, and Future," SPE 38441 presented at the 1997 SPE Reservoir Simulation Symposium, Dallas, Tex., 8–11 Jun. 1997; and (6) K. T. Lim, D. J. Schiozer, K Aziz, "A New Approach for Residual and Jacobian Array Construction in Reservoir Simulators," SPE 28248 presented at the 1994 SPE Petroleum Computer Conference, Dallas, Tex., Jul. 31–Aug. 3, 1994.

Efforts have been made to perform widely varying reservoir simulation methods in a single computer code. However, such "general-purpose" simulation systems are very complex, largely because they are designed to have one or more of the following capabilities:

(1) represent many different types of cells (e.g., different domains of a reservoir, well tubing, and surface gathering and distribution facilities, and surface processing facilities);

(2) use different timestep computation methods (e.g., IMPES, fully implicit, sequential implicit, adaptive implicit, and/or cascade methods);

(3) use different ways of representing reservoir fluids;

(4) use multiple ways of computing transport between cells;

(5) perform what is called a "black-oil model," which treats the hydrocarbons as being made up of two components, and also having the capability of performing compositional representations in which the hydrocarbons are assumed to contain compounds such as methane, ethane, propane, and heavier hydrocarbons;

(6) simulate steam injection or in situ combustion processes, which must take into account temperature changes as a function of time which require an energy balance and related calculations;

(7) simulate miscible recovery processes using special fluid properties and transport calculations;

(8) simulate hydrocarbon recovery processes that take into account injection of surfactants, polymers, or other chemicals and the flow of these fluids into the reservoir;

(9) simulate injection of chemicals that react with each other, the reservoir hydrocarbons, or the reservoir rock; and

(10) simulate migration of hydrocarbons and geologic deposition over geologic time.

Most reservoir simulators use so-called structured grids in which the cells are assumed to be three dimensional rectangular shapes distorted to conform as well as possible to geological features and flow patterns. Certain geological features and modeling situations cannot be represented well by structured grids. This shortcoming can be overcome in part by using local refinement, in which selected cells are subdivided into smaller cells, and non-neighbor connections, which allow flow between cells that are physically adjacent to each other but are not adjacent in the data structure. A more powerful solution to this problem is to exploit the flexibility provided by a totally unstructured grid. This requires reorganizing the way the simulation program stores its data and performs its computations.

Because general-purpose computing in reservoir simulation can require substantial computing resources, proposals have been made to subdivide a simulation model into smaller segments and to perform computations in parallel on multiple-processor computers. The principal attraction of parallel computing is the ability to reduce the elapsed time of a simulation, ideally by a factor of n for an n-processor computer. Parallel computing falls short of the ideal because of several factors, including recursion in linear equation solution, the overhead associated with message passing. required for various computations, and load imbalances due to heterogeneities in the problem physics and characterization of the hydrocarbon fluids.

General-purpose simulation programs developed in the past use regular, structured cells having a variety of connection and cell types. These simulation programs have treated these connection and cell types in different ways, resulting in unsystematic methodologies and complex code. When local refinement, non-neighbor connections, and parallel computing capabilities are added to such programs, they can become extremely complex and difficult to use. Such programs tend to be inefficient and unreliable.

There is a continuing need in the industry for a reservoir simulation program that can perform widely varying types of simulation calculations using an unstructured grid on parallel computers. As a result, there is a need for a method that orgies and implements the simulation calculations in a way that minimizes complexities while providing computational efficiency.

SUMMARY OF THE INVENTION

An object-oriented method is disclosed for simulating a property of at least one fluid in a fluid-containing physical system, said physical system being-represented by a multiplicity of volumetric cells and a multiplicity of connections between cells, comprising using cell-group objects and connection-group objects in the simulation. The invention can optionally comprise additional objects such as an object containing the entire model of the simulation and another object containing a portion of the entire model.

BRIEF DESCRIPTION OF THE DRAWINGS

The present invention and its advantages will be better understood by referring to the following detailed description and the attached drawings, in which the like elements have been given like numerals and wherein:

FIG. 8A illustrates an eight-cell simulation model and FIG. 8B schematically illustrates an arrangement of cells and connections corresponding to FIG. 8A.

FIG. 9 schematically illustrates examples of cell-groups and connection-groups made from the cells and connections of FIG. 8B that can be used in the method of the present invention.

Figure 1A:
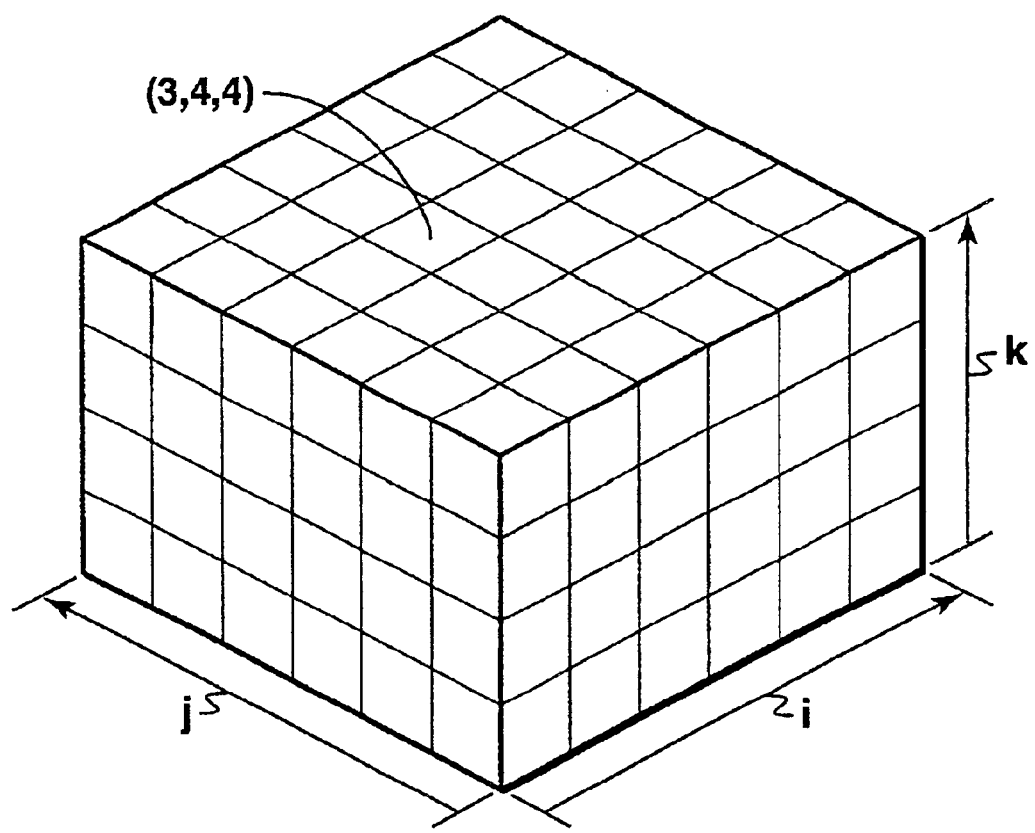
FIG. 1A is a simplified example of a three-dimensional structured grid system having six cells in the j direction, six cells in the i direction, and four cells in the k direction.

The drawings are not intended to exclude from the scope of the invention other embodiments that are the result of normal and expected modifications of these specific embodiments.

DETAILED DESCRIPTION OF THE INVENTION

The present invention provides a new method for simulating a physical system that is numerically represented by partial differential equations. The method can be used in simulating two- and three-dimensional domains that are discretized into structured grids, unstructured grids, or a combination of both. The method can also be used in situations in which the computational approach yields a topology having more than three dimensions, such as occurs in simulating fluid flow through fractured porous media The invention is particularly useful in simulating a characteristic of a physical system in which a transport phenomenon is occurring. The term "transport phenomena" as used in this description is used in a broad sense to include momentum transport (viscous flow), energy transport (heat conduction, convection, and radiation), and mass transport (diffusion). The present invention can be applied to widely different areas such as physics, rock characterization, crystallography, electrical engineering, biology, mathematics, fluid mechanics, and petroleum engineering. For example, the present invention can be used to simulate removal of hydrocarbons from reservoir rock using various supplemental recovery techniques such as, but not limited to, thermally-based recovery methods such as steam flooding operations, waterflooding operations, and gas-drive-based methods that can operate under either miscible or immiscible conditions. The present invention can also be used in modeling contaminant transport through subterranean formations. The present invention is particularly useful in performing general-purpose reservoir simulation on unstructured grid systems, and is especially useful for parallel computing in simulating hydrocarbon-bearing systems, which can include not only the reservoir, but also injection wells, production wells, surface flowlines, associated aquifers, and surface processing facilities.

The simulation method of this invention stores computational data and organizes the calculations in a novel way. The invention is based on using two types of software programming "objects" using principles of "object-oriented programming": one object containing a group of cells and the other object containing a group of connections. The invention can optionally comprise additional objects such as an object containing the entire model and another object containing a portion of the entire model. The four types of objects are referred to in this description of the invention as a "cell-group", "connection-group", "model", and "submodel", respectively.

Each cell-group contains all or substantially all data needed to perform computations on the cells it contains.

These cells all must have certain common characteristics. For example, one cell-group could contain reservoir cells on which fully implicit calculations are performed and another cell-group could contain reservoir cells on which IMPES calculations are performed.

Each connection-group contains all or essentially all data needed for computations related to the connections it contains. Flow through all of these connections must be computed in the same way. Nonlimiting examples include having all connections in one connection-group use Darcy's law, all connections in another connection-group use mechanistic multiphase turbulent flow calculations, and all connections in still another connection-group use multiphase flow calculations based on pre-defined hydraulics tables. In addition, each connection in a connection-group must be from a cell in one cell-group to another cell in the same cell-group, or from a cell in one cell-group to a cell in a particular other cell-group.

A submodel contains one or more cell-groups and zero or more connection-groups that connect a particular cell-group's cells to each other or connect cells in one particular cell-group to cells in another of the submodel's cell-groups. A model contains one or more submodels and zero or more connection-groups that connect these submodels to each other.

For example, if a simulation model comprises two cell-groups, one containing IMPES cells and one containing filly implicit cells, the model could have at least three connection-groups, as follows.

1. Connections between cells in the WIPES cell-group;
2. Connections between cells in the fully implicit cell-group;
3. Connections between cells in the IMPES cell-group and cells in the filly implicit cell-group.

The model and submodel objects are particularly suitable for use in performing simulation computations in parallel.

In contrast to simulation programs in the prior art that performed iterations over cells, the method of the present invention performs iterations over cell-group objects. In performing iterations in the method of the present invention, each cell-group object invokes a suitable iteration method that iterates over its cells and performs the desired computations at each cell. Similarly, calculations that formerly were performed by iterating over connections are now performed by iterating over connection-group objects, with each connection-group invoking its method that iterates over its connections and performs the desired computations at each connection.

Each connection-group object "knows" (i.e., has information specifying) which two cell-groups it connects or that it connects a cell-group to itself. Similarly, each of the connection-group's connections knows which two cells, one in the first cell-group and one in the second cell-group (which could be the same as the first) that it connects.

The cell-group and connection-group objects provide a novel method for organizing the software in such a way that normally complex computations can be performed within a simple, consistent structure. There can be as many cell-group and connection-group types as are needed to perform the desired types of computations. Adding new cell-group and connection-group types does not increase the complexity of the program's overall structure. The methods required to perform the computations needed by new cell-group and connection-group types are encapsulated within their software "classes".

The model and submodel objects provide a way to organize the special computations associated with parallel processing. These objects make it possible to perform parallel processing in such a way that the additional complexity is minimized and isolated. Compared to simulation programs used in the past, the benefits of the present invention can be obtained with virtually no loss in computational efficiency.

Before proceeding further with the detailed description, basic principles of forming cells and connections, parallel computing, and object-oriented programming are provided to aid the reader in understanding the invention.

Cells and Connections

In practicing the method of the present invention, the physical system to be simulated is subdivided into a multiplicity of volumetric cells. These cells can number from fewer than a hundred to millions. The discretization is performed using finite difference, finite volume, finite element, or similar methods that are based on dividing the physical system to be modeled into smaller units. This description of the present invention primarily refers to finite difference methods. Those skilled in the art will recognize that the invention can also be applied with finite element methods or finite volume methods. When it is applied with finite element methods, the cells become finite elements, and when it is applied with finite volume methods, the cells become finite volumes. In this patent, for simplicity of presentation, the term "cell" is used, but it should be understood that if a simulation model uses the finite element method the term element would replace the term cell as used in this description and claims. Regardless of which of these methods is used, discretization reduces partial differential equations to a finite-dimensional system of algebraic equations.

Figure 1B:
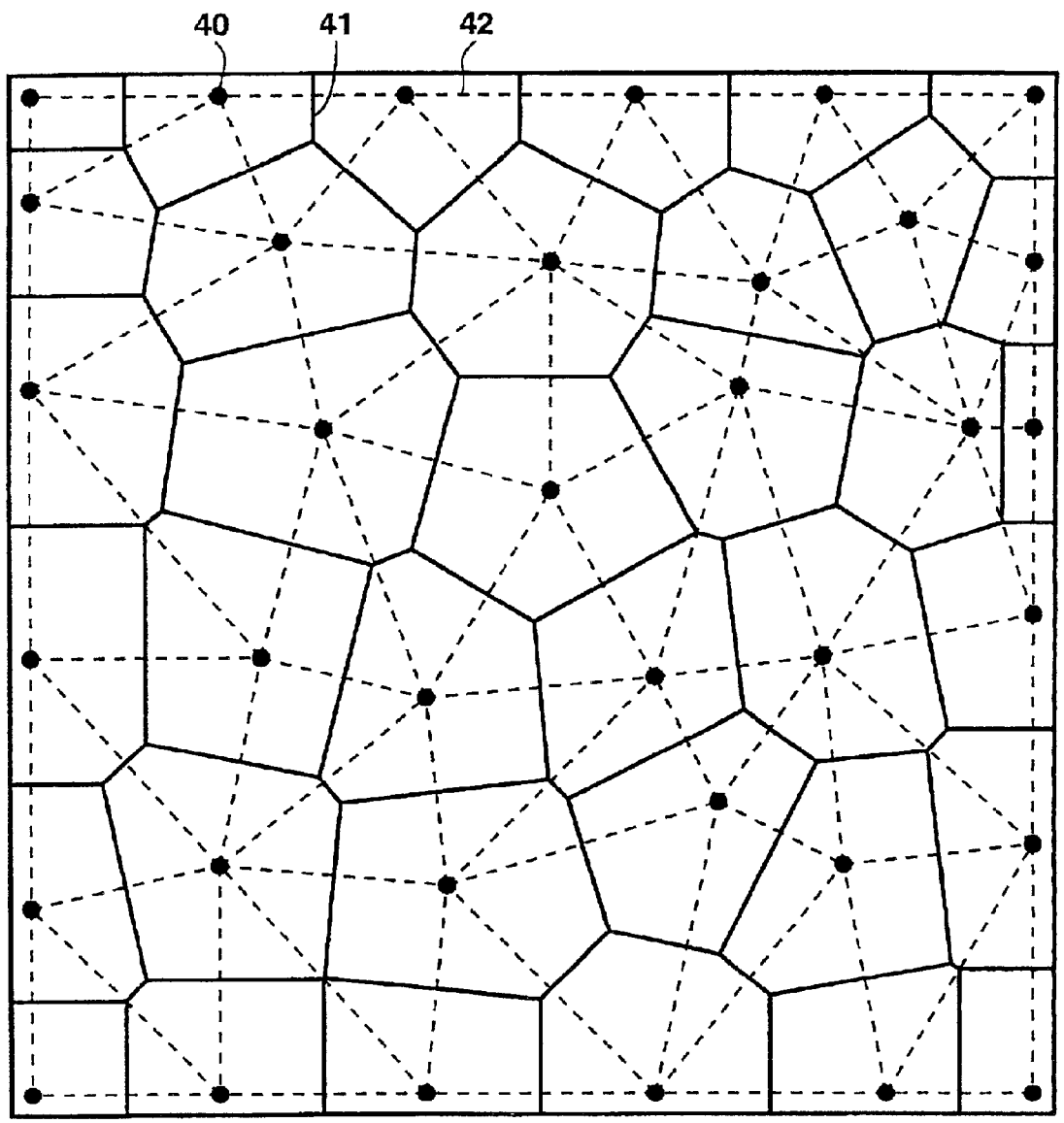
FIG. 1B illustrates an example of a two-dimensional unstructured grid having 36 cells.

In the practice of this invention, the cells can be of any geometric shape, such as parallelepipeds (or cubes) or hexahedra (typically having four approximately vertical corner edges which may vary in length), or tetrahedra, rhomboids, trapezoids, or triangles. The grid can comprise rectangular cells organized in a regular, structured pattern (an example of which is illustrated in FIG. 1A). Structured cells therefore have similar shape and the same number of sides or faces. The most commonly used structured grids are Cartesian or radial in which each cell has four sides in two dimensions or six faces in three dimensions. The grid can also comprise cells having a variety of shapes laid out in an irregular, unstructured pattern, or the grid can comprise a plurality of both structured and unstructured patterns. A grid is called flexible or unstructured when it is made up of polygons (polyhedra in three dimensions) having shapes, sizes, and number of sides or faces that can vary from place to place (an example of a two-dimensional unstructured grid is illustrated in FIG. 1B, which is discussed in more detail below). Completely unstructured grids can be assembled that assume almost any shape. All the cells are preferably, but not necessarily, boundary aligned with other cells, thereby avoiding having any side of a cell contacting the sides of two other cells.

Conventional reservoir simulation models typically assume that most of the cells representing the reservoir are laid out in a structured, Cartesian grid. FIG. 1A illustrates an example of a conventional representation of a three-dimensional domain of a reservoir. This representation makes it possible to identify each cell by a set of indices such as (i,j,k). An example of a Cartesian grid system is shown in FIG. 1A. Referring to FIG. 1A, using the index system (i,j,k), the cell designated (3,4,4) can be represented in this manner in a computer. Data defined on a Cartesian grid can be represented using the conventional arrays that are available in most programming languages; those skilled in the art can use such arrays to represent quantities applicable to these cells. For example, the pressure at cell (i,j,k) could be referred to in FORTRAN programming language as P(I,J, K), where P is a floating point array that has been dimensioned appropriately. This approach has the convenient feature that a cell's neighbors are easily known. For example, the pressure at each of cell (i,j,k)'s six neighbors is P(I−1,J,K), P(I+1,j,K), P(I,J−1,K), P(I,J+1,K), P(I,J,K−1), and P(I,J,K+1), respectively. Other quantities defined at cells are treated in the same way.

If fluid can be transported directly between two cells, the cells are considered "connected," and the fluid is represented as flowing through the connection between them. Quantities are defined for these cell connections, just as quantities are defined for the cells themselves. These quantities are stored in arrays having the same dimensions as arrays containing quantities defined at cells. For example, an i-direction transmissibility between cell (i,j,k) and cell (i+1,j,k) can be referred to as TI(I,J,K) with the understanding that TI(NI, J,K), where NI is the maximum value of i, really does not exist, since it would connect the cell to a cell outside of the simulation model; this has the same effect as would setting TI(NI,J,K)=0. Similarly, there are a j-direction transmissibility, TJ(I,J,K), between cells (i,j,k) and (ij+1,k), and a k-direction transmissibility, TK(I,J,K), between cells (i,j k) and (ij,k+1); which are stored in an analogous fashion.

In FORTRAN language, a three-dimensional array can be dimensioned in terms of the maximum size permitted for each of the indices. For example, the pressure array discussed in the foregoing can be dimensioned P(NI,NJ,NK), where NI, NJ, and NK are the maximum values permitted for I, J, and K, respectively, when referring to P(I,J,K). FORTRAN orders elements of the arrays in memory such that elements at successive values of I are adjacent to each other, elements at successive values of J are separated by NI elements, and elements at successive values of K are separated by NI*NJ elements. The value of P(I,J,K) is stored in the IJKth element of the P array, where I,J,K=I+(J−1)*NI+ (K−1)* NI*NJ.

Figure 2A:
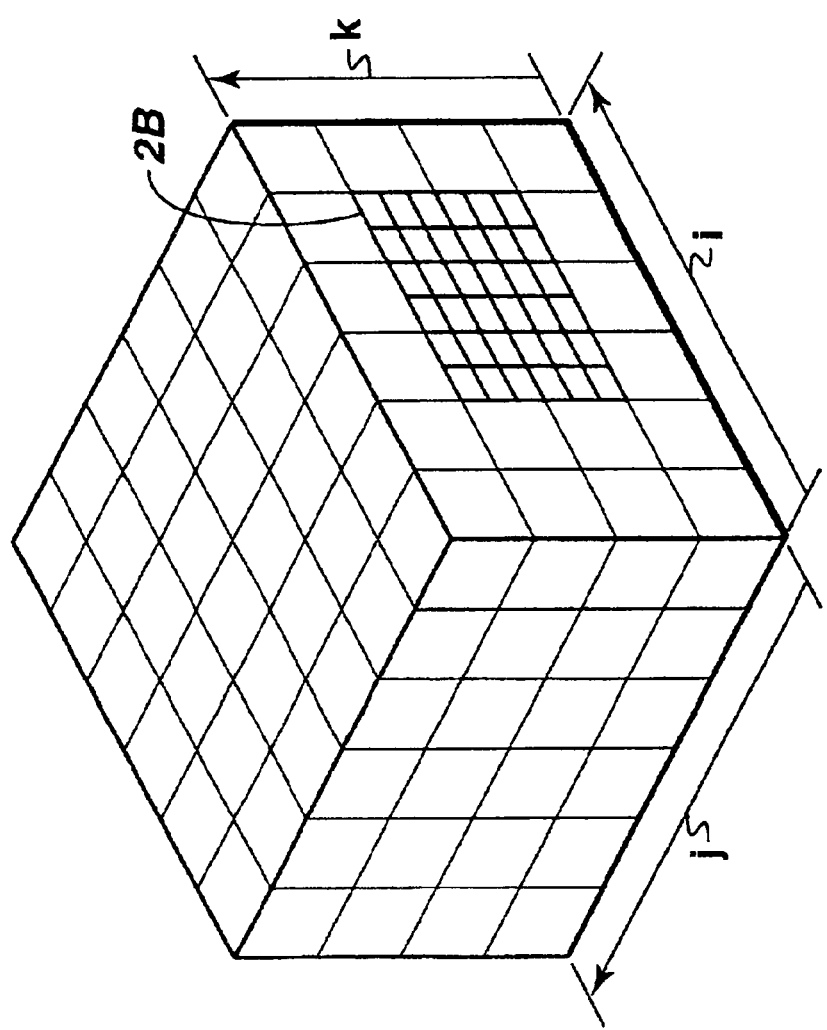
FIG. 2A is a simplified example of a three-dimensional structured grid system similar to the example of FIG. 1A except that a portion of the grid system is subdivided into additional cells as shown schematically as FIG. 2B.
Figure 2B:
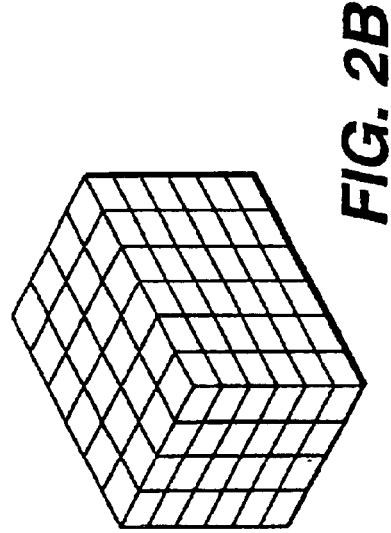

While structured grids are easy to use, they lack flexibility in adapting to changes in reservoir and well geometry and often cannot effectively handle the spatial variation of physical properties of rock and fluids in the reservoir. This inflexibility limits the types of hydrocarbon systems that structured grids can represent efficiently. In an attempt to overcome these shortcomings various improvements have been proposed. For example, it is often desirable to use a detailed representation of one part of the reservoir and coarser representations of the rest of the reservoir. This can be accomplished through a local refinement capability. This can be implemented so that a rectangular group of cells is replaced by a grid of smaller cells. For example, referring to the coarse grid system shown in FIG. 2A, cells in the intervals (i=3, 4, 5; j=1, 2; k=2, 3) could be replaced by a 6 by 4 by 6 grid of smaller cells as shown in FIG. 2B. Like the coarse grid (FIG. 2A), this local fine grid (FIG. 2B) is also structured.

Figure 3:
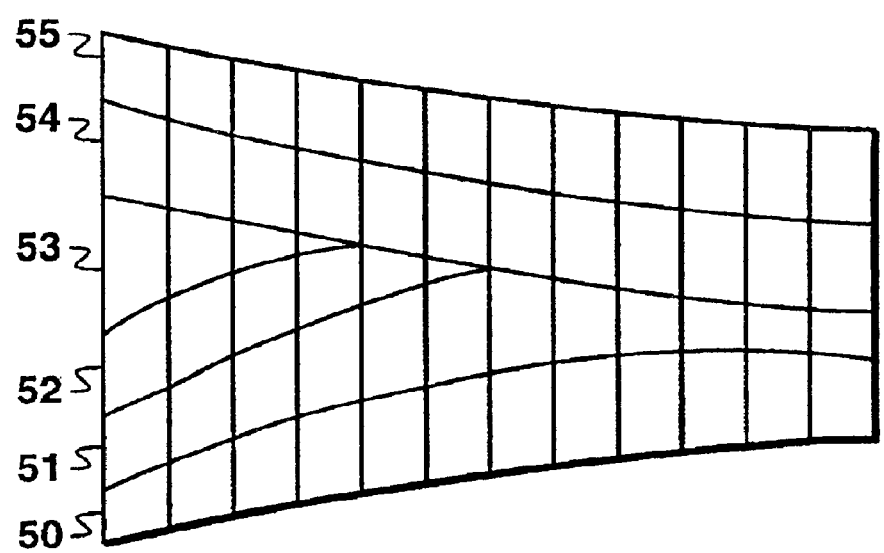
FIG. 3 is a simplified example of a two-dimensional, irregular grid system having rows of cells that terminate within the model.

Structured grids have difficulty representing geologic layers in the reservoir that "pinch out," or disappear. FIG. 3 illustrates a two-dimensional representation of cell layers 50 through 55 in which cell layers 52 and 53 disappear due to a pinchout, which would permit direct flow between cell layers 51 and 54. One way of representing pinchout layers is for the corresponding layers in the simulation grid to also disappear in these locations. When this happens, a connection is created between cells that normally would not communicate directly with each other. Simulation programs have been proposed that handle this pinchout problem by what are commonly called special or non-neighbor connections between cells.

In general, reservoir simulations of hydrocarbon-bearing systems that comprise significantly different fluid flow environments cannot be conveniently treated by structured, rectangular grids. To carry out such simulations, a connection between the different flow environments must be provided.

Figure 4:
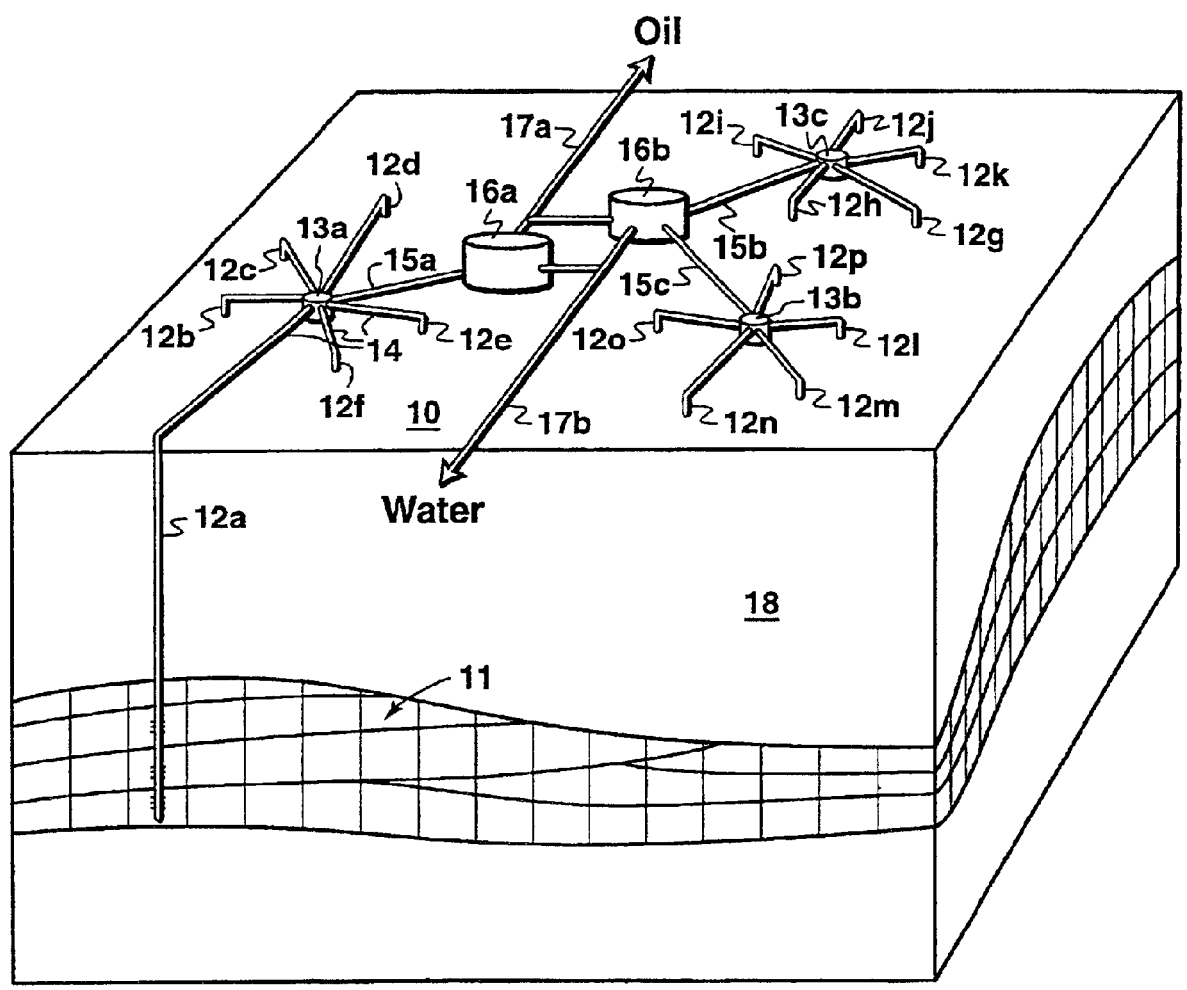
FIG. 4 illustrates a simple schematic of a three-dimensional representation of a hydrocarbon-bearing system that could be represented by a general-purpose reservoir simulator using the method of the present invention.

FIG. 4 illustrates a nonlimiting schematic of a simplified three-dimensional hydrocarbon-bearing system comprising a hydrocarbon-bearing formation 11 that is penetrated by a multiplicity of wells 12a through 12p (only one well 12a is shown in the drawing as passing through an overburden 18 into the formation 11). Each well contains tubing (not shown) that provides fluid communication between the earth's surface 10 and formation 11. Fluids produced from formation 11 pass through the wells 12a–p, through surface gathering lines 14, to pumping units 13a, 13b, and 13c, through additional gathering lines 15a, 15b, and 15c, and into surface processing facilities 16a and 16b, which could be conventional oil-water separators (for simplicity in presentation, only three of the multiple surface gathering lines between the wells and pumping units have reference numeral 14). From the processing facilities, the oil could be passed through line 17a and water could be passed through line 17b for further processing and/or handling. A reservoir simulation could include simulating fluid flow and compositions within the formation 11, through wells 12a–p, through surface gathering lines 14 and 15a–c, through pumping units 13a–c, and through processing facilities 16a and 16b.

To carry out simulation of the hydrocarbon-bearing system, the simulation will typically assume that the reservoir calculations are at unsteady state and that the facilities are at pseudo-steady state. The difference between the two assumptions relates to the number of cell volumes that flows through a cell during a timestep. Typically in a reservoir cell, the volume of fluid entering or leaving a cell during a timestep is only a small fraction of the cell's volume. In the surface system, however, many cell volumes can pass through a cell during a timestep. As a result, the time constants characteristic of the surface system would typically be much smaller than those of the reservoir. The surface system reaches an effective steady state during the typical timestep.

Flexible grids have been proposed for use in situations where structured grids are not as effective. Unstructured grids can conform to widely varying fluid flow environments more easily than structured grids and for this reason unstructured grids have been proposed for use in modeling hydrocarbon-bearing systems.

One type of flexible grid that can be used in the method and model of this invention is the Voronoi grid. A Voronoi cell is defined as the region of space that is closer to its contained central node than to any other node, and a Voronoi grid is made of such cells. Each cell is associated with a node and a series of neighboring cells. The Voronoi grid is locally orthogonal in a geometrical sense; that is, the cell boundaries are normal to lines joining the nodes on the two sides of each boundary. For this reason, Voronoi grids are more commonly called perpendicular bisection (PEBI) grids. In some cases, a rectangular grid block (Cartesian grid) is a special case of the PEBI grid. The PEBI grid has the flexibility to represent widely varying reservoir geometry, because the location of nodes can be chosen freely. PEBI grids are generated by assigning node locations in a given domain and then generating cell boundaries in a way such that each cell contains all the points that are closer to its node location than to any other node location.

Since the inter-node connections in a PEBI grid are perpendicularly bisected by the cell boundaries, this simplifies significantly the solution of flow equations for the case of isotropic permeabilities (i.e., permeabilities that are the same in all directions, though they may vary in space). Under this condition such a grid is called "k-orthogonal." For a k-orthogonal grid, transport between properties of the two cells and on the connection between them. For anisotropic permeabilities, the condition for k-orthogonality is more complex, but it is generally possible to create grids that satisfy it. Even when this cannot be done practically, the deviation from k-orthogonality is often small. In this case, the error is also small and the computation need not be changed. If the deviation from k-orthogonality is large, a multipoint flux approximation can be used. When a multipoint flux approximation is used, transport between two cells depends on properties of those two cells and of certain neighbors as well. For the sake of simplicity, the discussion that follows assumes k-orthogonality, but the method of this invention can be extended by those skilled in the art based on the teachings of this patent to handle multipoint flux approximations.

FIG. 1B illustrates an example of a two-dimensional PEBI grid. The dots 40 denote cell nodes, the continuous lines 41 denote cell boundaries, and the dashed lines 42 connecting the nodes denote inter-cell connections. Fluid flow as well as other transport phenomena between two nodes are typically modeled as flow along the connection between them. The mesh formed by connecting adjacent nodes of PEBI cells is commonly called a Delaunay mesh if formed by triangles only. In a two-dimensional Delaunay mesh, the reservoir is divided into triangles with the nodes at the vertices of the triangles such that the triangles fill the reservoir. Such triangulation is a Delaunay mesh when a circle passing through the vertices of a triangle (the circumcenter) does not contain any other node inside it. In three-dimensions, the reservoir region is decomposed into tetrahedra such that the reservoir volume is completely filled. Such a triangulation is a Delaunay mesh when a sphere passing through the vertices of the tetrahedron (the circumsphere) does not contain any other node. For a more detailed description of PEBI grid generation, see Palagi, C. L. and Aziz, K.: "Use of PEBI Grid in Reservoir Simulation," paper SPE 22889 presented at the 66th Annual Technical Conference and Exhibition, Dallas, Tex. (Oct. 6–9, 1991).

Computations on unstructured grids can use a data structure based on cells and connections. See for example a paper by K. T. Lim, D. J. Schiozer, K. Aziz, "A New Approach for Residual and Jacobian Array Construction in Reservoir Simulators," SPE 28248 presented at the 1994 SPE Petroleum Computer Conference, Dallas, Tex., Jul. 31–Aug. 3, 1994, which proposes use of cells and connections. The dimension of the pressure array is set equal to the number of cells, with pressure at cell n being written P(N). The three transmissibility arrays mentioned in the foregoing are folded into a single array dimensioned large enough to contain all transmissibilities. Accompanying this array, there must also be two integer arrays indicating which two cells a given transmissibility connects. For example, assume that the cells remain in the same order as they are in the structured grid example discussed in the foregoing. Then in the new data structure, P(N) corresponds to P(I,J,K), where N=I+(J−1)*NI+(K−1)*NI*NJ. If T(M) corresponds to TK(I,J,K), then these two integers have the values IL(M)=N and IR(M)=N+NI*NJ.

The method and program of this invention is not limited to simulations of a particular number of dimensions. The predictive program can be constructed for one-dimensional (1-D), two-dimensional (2-D), and three-dimensional (3-D) simulation of a physical domain. In reservoir simulation applications, a 1-D model would seldom be used for reservoir-wide studies because it can not model areal and vertical sweep. A 1-D gas injection model to predict displacement efficiencies can not effectively represent gravity effects perpendicular to the direction of flow. However, 1-D gas injection models can be used to investigate the sensitivity of reservoir performance to variations in process parameters and to interpret laboratory displacement tests.

2-D areal fluid injection models can be used when areal flow patterns dominate reservoir performance. For example, areal models normally would be used to compare possible well patterns or to evaluate the influence of areal heterogeneity on reservoir behavior. 2-D cross-sectional and radial gas injection models can be used when flow patterns in vertical cross-sections dominate reservoir performance. For example, cross-sectional or radial models normally would be used to model gravity dominated processes, such as crestal gas injection or gas injection into reservoirs having high vertical permeability, and to evaluate the influence of vertical heterogeneity on reservoir behavior.

3-D models may be desirable to effectively represent complex reservoir geometry or complex fluid mechanics in the reservoir. The model can for example be a 3-D model comprising layers of PEBI grids, which is sometimes referred to in the petroleum industry as 2½-D. The layered PEBI grids are unstructured areally and structred (layered) vertically. Construction of layered 3-D grids is described by (1) Heinemann, Z. E., et al., "Modeling Reservoir Geometry With Irregular Grids," *SPE Reservoir Engineering*, May, 1991 and (2) Verma, S., et al., "A Control Volume Scheme for Flexible Grids in Reservoir Simulation," SPE 37999, SPE Reservoir Simulation Symposium, Dallas, Tex., Jun., 1997.

Parallel Computing

To reduce the time needed for simulation computations, it may be desirable to perform the simulation on several central processing units (CPUs) in parallel. These CPUs can share memory within a single unit or each of several CPUs connected in a network can have its own memory. These two types of systems use what is called shared memory and distributed memory, respectively. In addition, several multiple-CPU units can be connected in a network, resulting in a hybrid distributed-shared memory system.

Figures 5A, 5B, 5C:
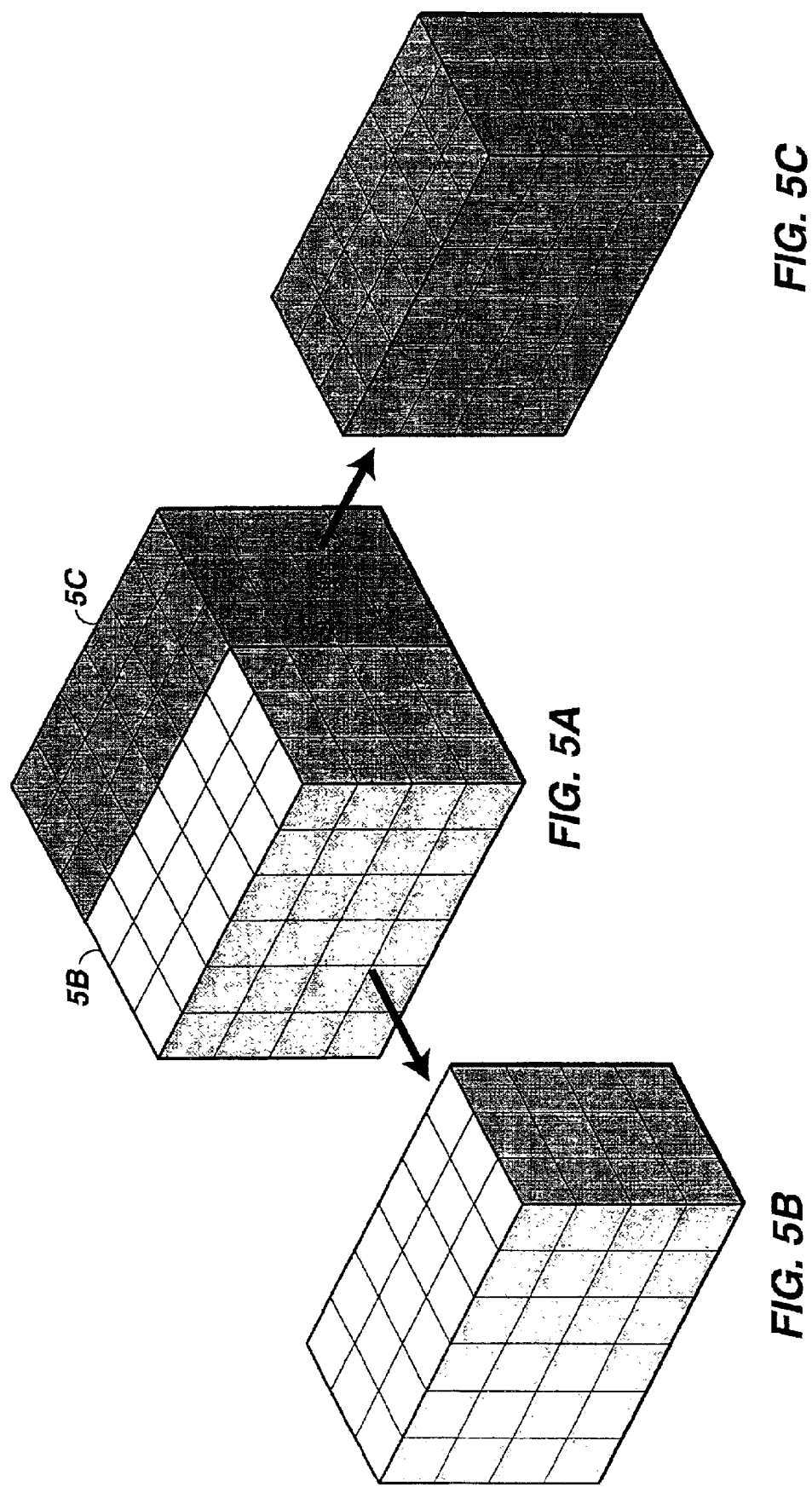
FIG. 5A illustrates a simplified schematic of a three-dimensional structured grid, similar to the example of FIG. 1A, which is divided into two domains shown as FIGS. 5B and 5C.

Regardless of whether memory is shared or distributed, parallelism in simulation computations is achieved in essentially the same way. The model is subdivided into computational units commonly called "domains." For example, if two CPUs are available for use, the grid model shown in FIG. 5A could be divided into two domains, which are shown in FIGS. 5B and 5C. This division would typically be done such that all domains contain as near as possible the same number of cells. In the example shown in FIG. 5A, the two domains (FIGS. 5B and 5C) contain exactly the same number of cells. Each domain could be assigned to one of the two CPUs, and each CPU could perform nearly all of the computations related to its domain. At certain steps in the computations, it is necessary to transfer data between domains and, hence, between CPUs. This is done using what is sometimes called "message passing." In the model, each cell is assigned to one of the two domains. Also, each connection between two cells in the same domain is assigned to that domain. Connections between cells in different domain can be viewed as belonging to one of the domains, belonging to both domains, or belonging to neither. In the present invention, it is preferable to consider the between-domain connections as belonging to neither of the domains but being used by both of them. In any case, the between-domain connections will require treatment that differs from within-domain connections.

Object-Oriented Programming

The method and model of this invention is implemented using object-oriented programming ("OOP") techniques. The most common programming languages for OOP are Simula, Eiffel, C++, Smalltalk, Objective-C, or variations thereof. However, the practice of this invention is not limited to a particular OOP language. The design of OOP is well known to those skilled in the art of OOP systems and will only be described generally. A more detailed description of the design and operation of an object-oriented program is provided in *"What Every Programmer Should Know About Object-Oriented Design"* by Meilir Page-Jones, Dorset House Publishing, New York, 1995.

In an object-oriented program, the focus is primarily on data and secondarily on the functions that access that data, rather than being primarily on functions and secondarily on the data they require. In contrast with a program that is described mainly by procedures with data input to and output from each procedure (such as a program written in FORTRAN or COBOL), an object-oriented program is organized around "objects." An object is a data structure and a set of operations or functions that can access that data structure. OOP systems will typically contain a large number of objects. Each operation (function) that can access the data structure is called a "method." Each object is a member of a "class". Such an object is said to be an "instance" of the class of which it is a member. The class defines the information associated with the object (its data) and the operations it can perform (its methods). OOP enables objects to model virtually any real-world entity in terms of its characteristics, represented by data, and its behavior, represented by the operations it can perform using the data. In this way, objects can model concrete things like cells in a reservoir simulation and abstract concepts like numbers. For the purposes of the present invention, benefits of OOP arise out of three basic principles: encapsulation, polymorphism, and inheritance.

Objects hide, or encapsulate, the internal structure of their data and the algorithms by which their functions work. Instead of exposing these implementation details, objects present interfaces that represent their abstracts clearly with no extraneous information. The interface allows only a limited number of interactions between the outside world and an object. In C++programming, most of these interactions involve invoking methods of the object. By invoking an object's methods, the outside world can tell the object to do something, but the details of how the object performs this action are not visible to the outside world. In effect, the object encapsulates its data and methods and hides them from the outside world.

Polymorphism takes encapsulation a step further. A software component can make a request of another component without knowing exactly what that component is. The component that receives the request interprets it and determines, according to its variables and data, bow to execute the request.

Inheritance allows developers to reuse pre-existing design and code. Inheritance allows previously written programs to be broadened by creating new superclasses and subclasses of objects. New objects are described by how they differ from preexisting objects so that entirely new programs need not be written to handle new types of data or functions. General data and methods belong to a "base" class. More specific classes "inherit" these data and methods and define data and methods of their own. These specific classes are "derived" from the base class.

Figure 6:
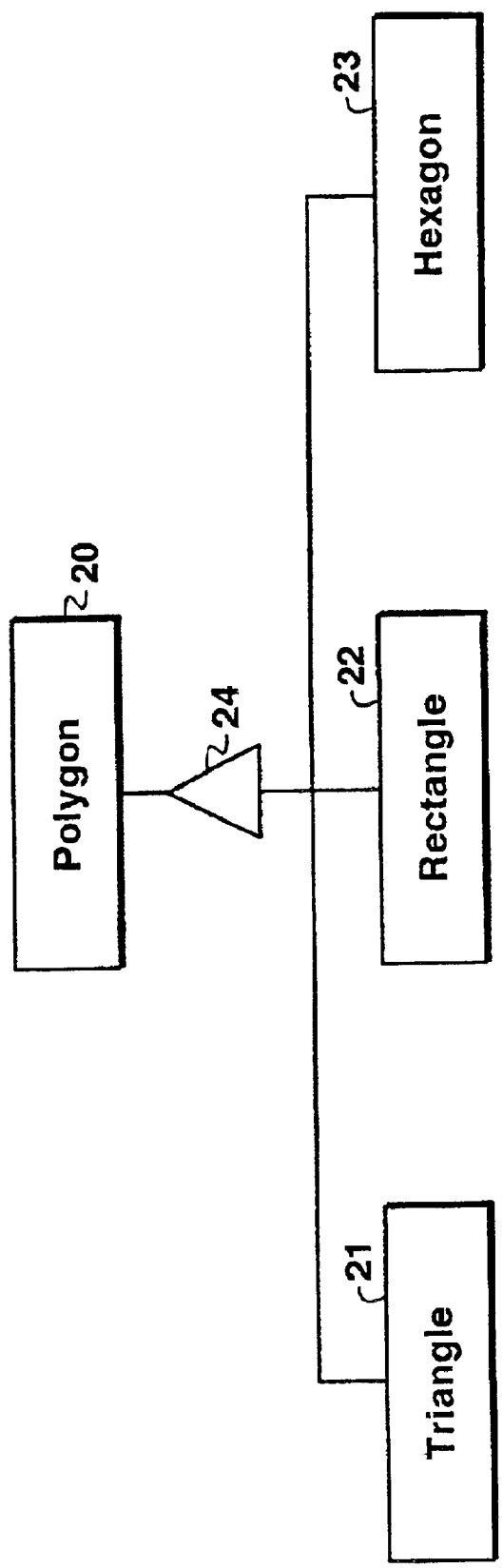
FIG. 6 illustrates generally the concept of inheritance in object-oriented programming.

An example of inheritance can be illustrated using classes that implement three types of polygons. For this example, a polygon can be a triangle, rectangle, or hexagon. Referring to FIG. 6, these three polygons can be implemented using a base class called Polygon 20 and three derived classes called Triangle 21, Rectangle 22, and Hexagon 23. The small triangle 24 in FIG. 6 indicates that the classes below it inherit from the class above it.

In this example, a Polygon can be a Triangle, Rectangle, or Hexagon. Regardless of which it is, it has an "area" and a "color". Accordingly, the base class Polygon contains data items called area and color. The three derived classes (Triangle, Rectangle, and Hexagon) inherit these data items from the base class. Furthermore, methods that are the same for the three derived classes can be in the base class. For example, a base class method can define the data items "area" and "color", allocate memory for them, and initialize them. However, the area computation is different for each of the three types of polygon, so each derived class must provide its own method for this computation. Thus, Triangle, Rectangle, and Hexagon each has a method called compute_area that performs the operations required to compute its area, whatever these operations are. The outside world then could contain, for example, an array of Polygon objects, of which some are Triangle objects, some are Rectangle objects, and some are Hexagon objects. It could get the area of each of these objects by asking it to compute_area. To obtain a particular polygon's area, the outside world would not have to know how it computed its area. In fact, the outside world would to not need to know what kind of polygon it was.

Figure 7:
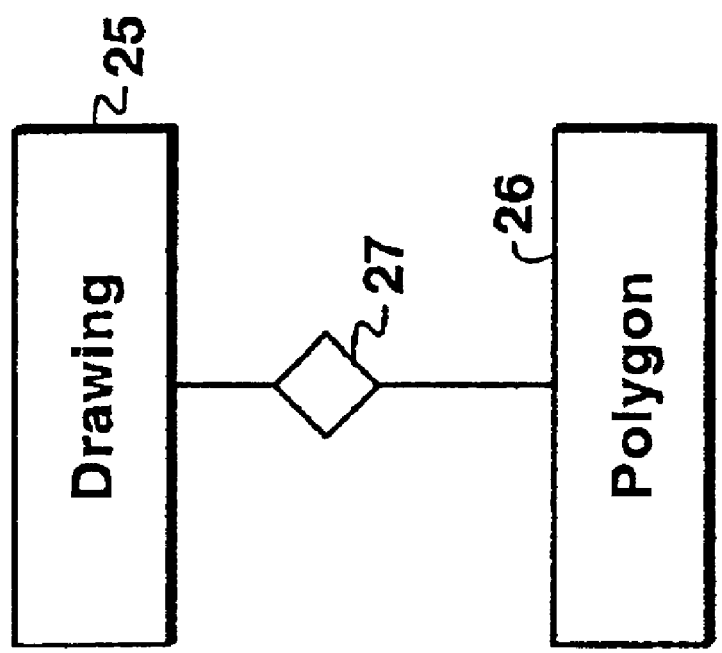
FIG. 7 illustrates generally the concept of containment in object-oriented programming.

Objects can contain other objects. For example, a drawing could contain polygons. Referring to FIG. 7, a drawing could be implemented as an object that is an instance of a class called Drawing 25. This object could contain Polygon 26 objects. In FIG. 7, the diamond 27 indicates that an object of the upper class, Drawing 25, contains an undefined number of objects of the lower class, Polygon 26. In this example, the number of Polygon objects allowed would be zero or more, since the Drawing should not be required to contain a polygon.

For an object, the outside world is the application's higher-level code that uses the object to accomplish its objectives. Encapsulation, polymorphism, and inheritance allow the higher-level code to handle objects that are similar but not identical in type as if they actually were identical in type. This greatly simplifies the higher-level code, making it practical to write code that performs more complex operations than are practical with a procedural language.

Cell and Connection Calculations

Most of the simulation calculations performed at each timestep can be divided among three categories:

1. fluid and transport property determination;
2. assembly of one or more matrix equations; and
3. solution of the matrix equation(s).

Fluid properties are defined at cells and thus are determined in iterations over the cells. Transport properties apply to connections,. although some can be defined at cells. Overall, transport properties are determined in a combination of iterations over cells and over connections. The matrix equation contains quantities defined at cells and quantities defined at connections. Correspondingly, its assembly is performed in a combination of iterations over cells and over connections.

After the matrix equation is assembled, it must be solved. As known to those skilled in the art, there are many ways of solving matrix equations. Typically, these require iterating over a cell's connections as well as over cells and, perhaps, all connections. The solution therefore requires additional information—a list of each cell's connections. This list can take on different forms, such as for example a list of indices of off-diagonal coefficients in a row of the matrix and a list of the columns in which these terms appear. Regardless of the list's form, the list should effectively identify each cell's connections.

Cell-Group Objects and Connection-Group Objects

One embodiment of the present invention uses at least two classes of objects defined based on principles of object-oriented programming: an instance of one class contains one or more cells, and an instance of the other class contains one or more connections. In other embodiments, additional objects can also be used, for example, but not limited to, an object containing the entire model and/or an object containing a portion of the entire model.

FIGS. 8A and 8B illustrate a simplified example of cells and associated connections. FIG. 8A shows a two-dimensional representation of 8 cells numbered 0 through 7. Cells 0, 1, 4, and 5 represent cells of a first simulation domain and cells 2, 3, 6, and 7 represent cells of a second simulation domain which is contiguous to the first domain.

Figure 10:
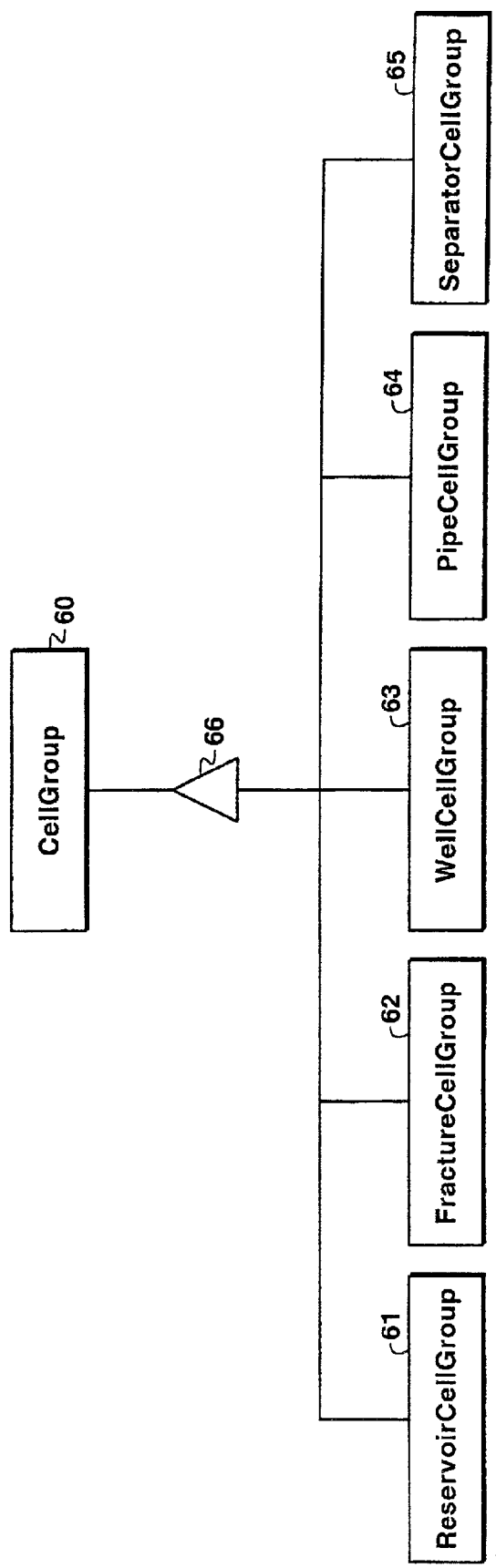
FIG. 10 is a diagram showing five cell-group classes that can be derived from a single base class.

FIG. 8B shows a schematic presentation of the eight cells of FIG. 8A and 10 connections between the cells. The 10 connections (identified by letters a, b, c, d, e, f, g, h, i, and j) are shown. Each connection is represented by a square with lines from the square to the two cells being connected by the connection. For example, connection "a" represents the connection between cell 0 and cell 1, and connection "g" represents the connection between cell 0 and cell 4.

FIG. 9 shows an example of how the cells and connections of FIG. 8B could be grouped in accordance with the practice of this invention. Referring to FIG. 9, cell-group 20 contains cells 0, 1, 4 and 5; cell-group 21 contains cells 2, 3, 6, and 7. Connection-group 30 contains connections a, g, h, and d; connection-group 31 contains connections b and e; and connection-group 32 contains connections c, i, j, and f. Cell-groups 20 and 21 were formed of cells within the same domain. The connection-groups 30 and 32 were formed from connections within the same domain and connection-group 31 was formed to represent the set of connections connecting cells of the first domain with cells of the second domain.

The present invention can implement computations using object-oriented programming principles involving various types of cells. Each cell's type is determined by specifying at least three characteristics—its physical type, its computational method: and its fluid representation.

For a reservoir simulation, each cell can be of one of the following nonlimiting examples of physical types:
1. Reservoir. This is the most common cell type.
2. Fracture. This cell could for example represent a fracture in a dual porosity-dual permeability model of a fractured reservoir.
3. Well. In a producing well, fluid flows from the reservoir into this cell. A well can comprise a single well cell or multiple well cells. In the former case, fluid that enters the cell from the reservoir leaves the cell to flow to surface gathering facilities. In the latter case, fluid flows from one well cell to the next until the well cell connected to the surface gathering facility is reached. From this well cell, fluid enters the surface gathering facilities.
4. Pipe. A pipe cell represents a segment of pipe. This pipe can be in the surface gathering system, or it can represent well tubing that is carrying produced fluid from a well cell to the surface.
5. Separator. A single fluid stream enters a separator, and two or more streams leave it. Typically a separator would separate either water from hydrocarbon or liquid hydrocarbon from vapor hydrocarbon.

Other types of cells are possible and this invention is not limited to the examples listed above. Persons skilled in the art could develop additional cell types that may be suitable for a particular simulation application.

FIG. 10 shows five classes represented by boxes 61, 62, 63, 64, and 65, which are based on the five cell types listed above, that can be derived from a single base class, which is referred to as CellGroup 60. CellGroup 60 will contain data and procedures common to the five derived classes 61, 62, 63, 64, and 65. Each of the derived classes (such as class 61, ReservoirCellGroup) will contain the data and methods unique to that class. The triangle 66 in FIG. 10 denotes inheritance as that term is used in object-oriented programming. This means that data and methods that are the same for the five derived classes (61–65) need be defined only in the base class, CellGroup 60.

A computation method must be selected for each cell. Nonlimiting examples of computational methods that could be performed include:
1. IMPES.
2. Fully implicit.

The implementation of the computation method can be done in such a way that it is the same for the five derived classes described in the foregoing. As a result, the computation method and the data that it requires can be placed in the base class, CellGroup 60. Each of the five derived classes (classes 61–65) will inherit the computation method from CellGroup 60.

A cell's fluid representation is defined in terms of which components are present, whether energy is included, and how properties are computed. One part of a simulation model could represent the reservoir fluids with one set of components and another part could represent the fluids with a second set of components. Alternatively, an energy balance calculation could be made in one part of the model and not in another. For a given set of components, properties could be calculated in different ways. The following is a nonlimiting list of properties calculations that are possible:
1. Oil-water black oil.
2. Oil-gas black oil.
3. Gas-water black oil.
4. Oil-gas-water black oil.
5. Oil-water thermal. The water can be in the liquid phase or in the vapor phase (as steam for example).
6. Oil-gas-water thermal.
7. Equation of state compositional.
8. Equilibrium value compositional.
9. Equation of state compositional thermal.
10. Equilibrium value compositional thermal.

Like the computation method discussed in the foregoing, the fluid property calculations can be implemented in the base class, CellGroup 60 of FIG. 10.

Each cell-group object combines one choice from each of the three categories of cell characteristics. For example, assume that a cell-group object's physical type is "well," its computational method is "fully implicit," and its fluid representation uses oil-gas-water black oil. It would therefore contain fully implicit well cells in which fluid properties are determined by a black-oil computation using the components "oil," "water," and "gas."

The first six types of the above-listed cell-groups are specific with respect to their component sets, which are the components that the six types use. The last four are not so specific; their component sets are defined as part of the simulation model's input data For the last four cell-group types, the number of components and their meaning can vary from cell-group to cell-group, but they must be fixed within a given cell-group.

In the foregoing example, there can be 5 times 2 times 10, or 100, possible combinations of physical cell types, computation methods, and fluid representations, but only one base class and five derived classes are required to implement them. Furthermore, due to the use of inheritance, the derived classes need implement only the features that are unique to them.

Deriving all cell-group classes from a single base class makes it possible to treat them polymorphically. In C++, for example, the higher level code that contains the cell-groups could refer to them through an array of pointers to the base class, CellGroup 60. This would allow the higher-level code to use the objects without knowing what specific kinds of cell-groups they were.

Assuming that multiple cell-group objects are used, multiple connection-group objects will also be used. Every connection in the simulation model must be placed in one of the connection-groups. Each connection-group connects either two cell-groups or a cell-group to itself. Each connection-group performs a certain type of transport computation. Each type of connection-group can connect only certain types of cell-groups. For example, it would be incorrect to connect two reservoir cells by a multiphase turbulent flow connection. On the other hand, a given type of connection-group may be able to connect several types of cell-groups. For example, a multiphase turbulent flow connection-group could connect a well cell-group to a surface gathering cell-group, a surface gathering cell-group to itself, or a surface gathering cell-group to a separator cell-group.

Each connection-group type is determined by specifying at least three properties: (1) how it computes fluid transport, (2) the computatiorial types of the cell-groups that it connects, and (3) whether it connects cell-groups that use different component sets. Nonlimiting examples of the bases of how transport can be computed are as follows, all of which relate to physical cell types:

1. Darcy's law using table lookup without hysteresis. Applicable for example to flow between cells in a reservoir.
2. Darcy's law using table lookup with hysteresis. Applicable for example to flow between cells in a reservoir.
3. Darcy's law using power law equations. Applicable for example to flow between cells in a reservoir.
4. Fracture-to-fracture flow.
5. Reservoir-to-fracture flow.
6. Mechanistic multiphase turbulent flow. Applicable for example to well-to-well, well-to-pipe, pipe-to-pipe, and pipe-to-separator flow.
7. Multiphase flow using tabular calculations. Applicable for example to well-to-well, well-to-pipe, pipe-to-pipe, and pipe-to-separator flow.
8. Reservoir-to-well flow.
9. Fracture-to-well flow.

Nonlimiting examples of computation types of the cell-groups connected include:

1. IMPES—IMPES.
2. Fully implicit-fully implicit.
3. IMPES-fully implicit.

Figure 11:
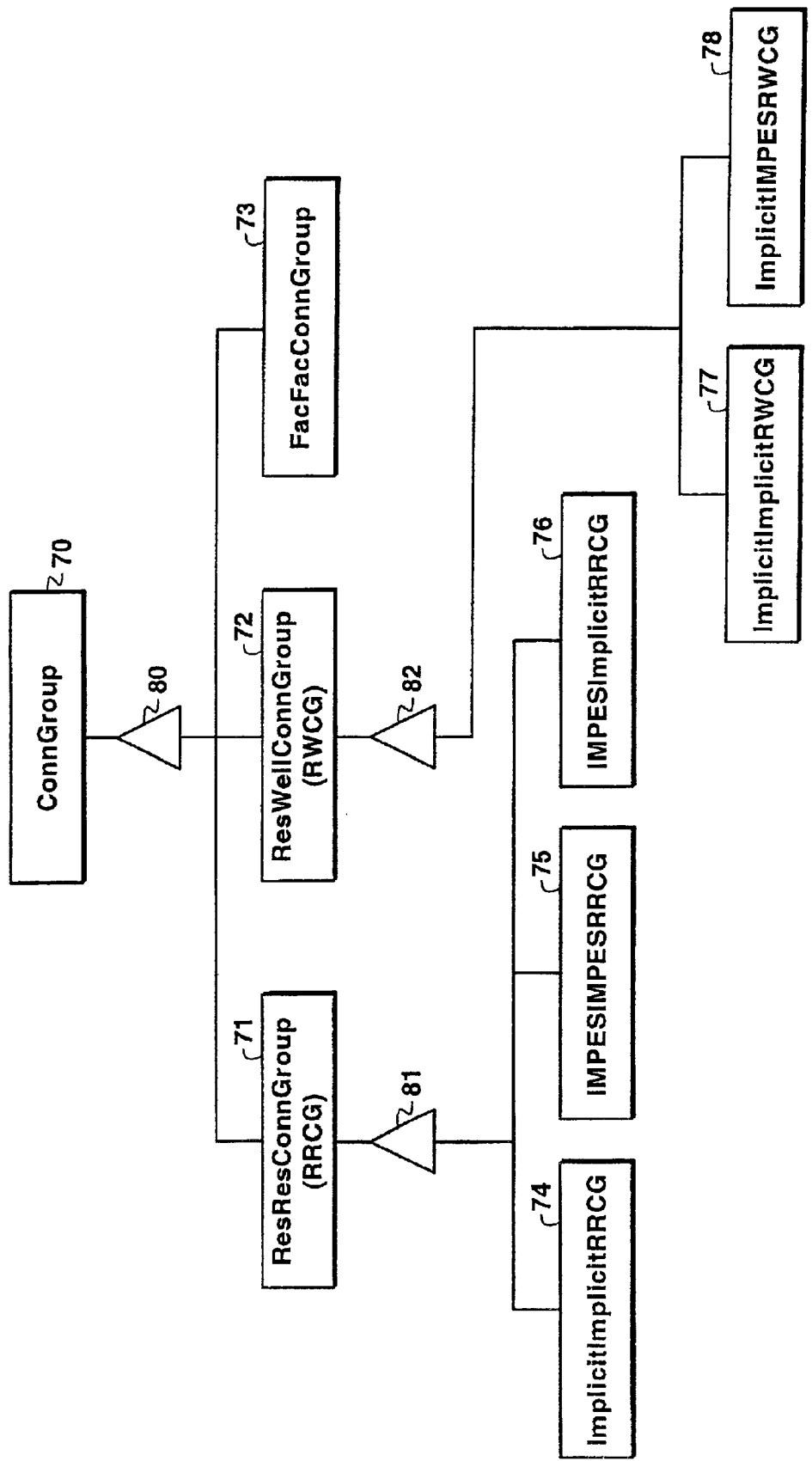
FIG. 11 is a diagram showing inheritance relationships among connection-group classes based on principles of object-oriented programming.

Based on the fluid representations used in the connected cell-groups, the fluid representations in the cell-groups can be represented as:

1. Same fluid representation used in both cell-groups; or
2. Different fluid representations used in the two cell-groups; or FIG. 11 diagrammatically illustrates classes that are needed to implement nine flow possibilities for the nine physical cell types listed in the foregoing and inheritance relationships among the resulting classes. A base class, shown as box 70 in FIG. 11 and called ConnGroup, could contain the common data and implement the common functions for the following three classes:

1. All reservoir-reservoir, reservoir-fracture, and fracture-fracture flows. This could be called the ResResConnGroup class, which is shown as box 71 in FIG. 11.
2. Reservoir-well and fracture-well flows. This could be called the ResWellConnGroup class, which is shown as box 72.
3. Flows within the facility network. This could be called the FacFacConnGroup class, which is shown as box 73.

Referring to FIG. 11, three forms of the ResResConnGroup (box 71) are needed; one form performs fully implicit-filly implicit calculations (box 74), another performs IMPES—IMPES calculations (box 75), and still another performs IMPES-fully implicit calculations (box 76). The ResWellConnGroup class (box 72) needs two forms: fully implicit-filly implicit (box 77) and IMPES-fully implicit (box 78). Within the facility network (box 73), only fully implicit calculations are performed because of stability limitations of the IMPES method. As a result, the FacFacConnGroup class needs only an implicit-implicit form. The triangles 80, 81, and 82 indicate that the lower classes inherit from the upper classes.

In addition, if thermal effects are being calculated, energy transport calculations must be performed. Convection of energy can be considered analogous to convection of mass. Since energy can also be transported by conduction, conduction calculations could also be included if desired, particularly for those connection types internal to the reservoir. In other connection types, convective energy transport may dominate and it would not be practical to include conduction calculations. Convective energy transport will usually be considered to be enough like convective mass transport that it need not be separately treated Conductive energy transport would require separate treatment, therefore each of the nine transport computation types listed above may in principle require a conduction calculation; in practice, however, conduction calculations will normally be required only in the reservoir.

The method of the present invention could also include calculations to take into account chemical reactions. In the absence of chemical reaction, mass conservation effectively means conservation of chemical compounds. In the presence of chemical reactions, since compounds can be created and destroyed, mass conservation means preservation of elements. Chemical reactions can also generate or consume energy. Inclusion of chemical reactions does not change the method of the present invention Its only impact is to add new types of cell-groups and connection-groups, which could be added by those skilled in the art based on the teachings of this description.

In foregoing description of this invention, only two object types are used: cell-groups and connection-groups. In another embodiment of this invention, one or more submodel objects and one or more model objects can also be included in the method. These objects act as containers for the cell-groups and connection-groups. A submodel object contains one or more cell-group objects and zero or more connection-group objects. Any connection-groups in the submodel connect either cells within one of the submodel's cell-groups to other cells in the same cell-group, or cells in one of the submodel's cell-groups to cells in another of the submodel's cell-groups. A model object contains one or more submodel objects and zero or more connection-group objects, each of which connects a cell-group in one of the model's submodels to a cell-group in another of the model's submodels. The connection-groups that are internal to a submodel are not visible to the model.

Figure 12:
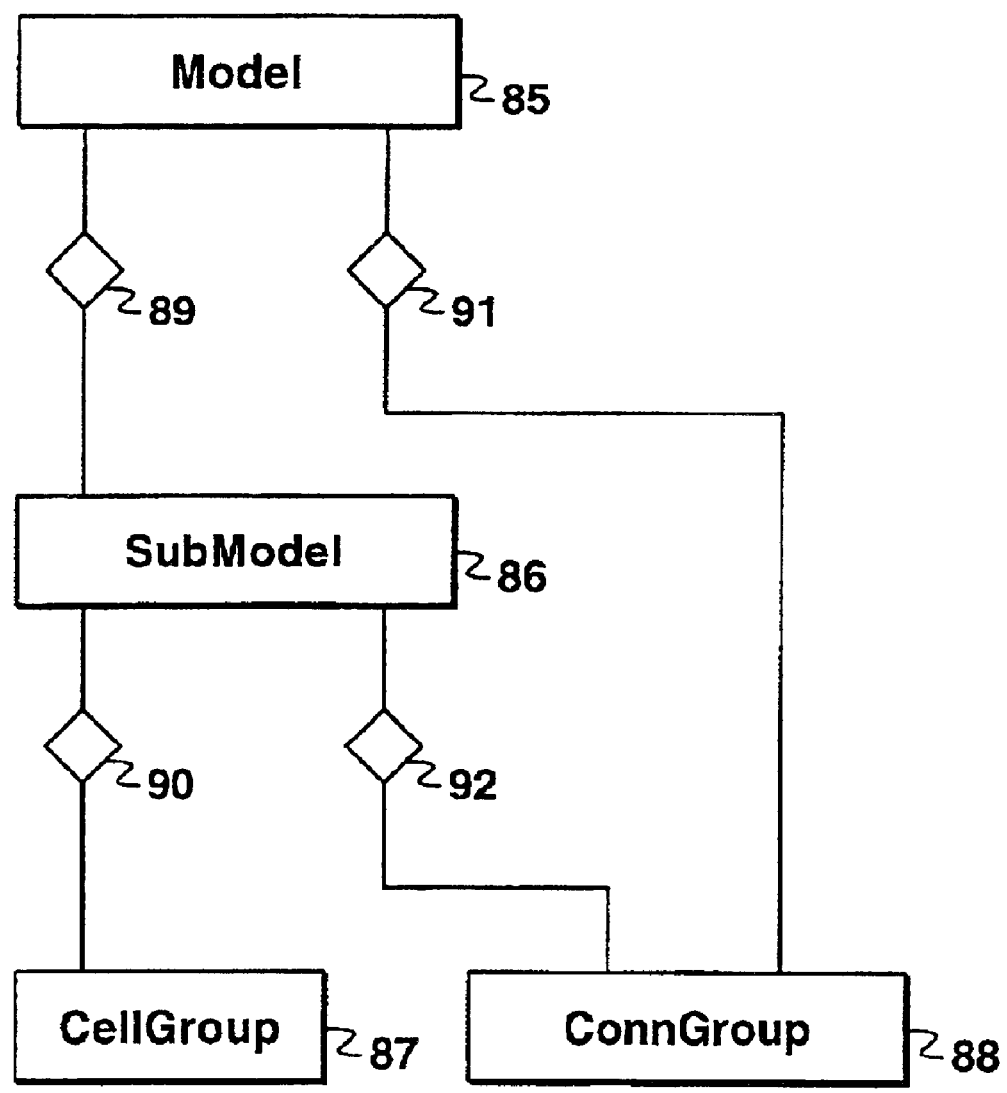
FIG. 12 is a diagram showing the class relationships among the four types of objects used by the current invention.

FIG. 12 is a simplified schematic illustrating containment relationships of classes called Model 85, SubModel 86, CellGroup 87, and ConnGroup 88. The diamond-shaped symbols 89, 90, 91, and 92 denote containment as that term is used in object-oriented programming. Referring to FIG. 12, a Model 85 can contain one or more SubModels 86. If there is only one SubModel 86, there will be no ConnGroup 88 contained directly by the Model 85. If there are two or more SubModels 86, and there are connections between them, the Model 85 will contain one or more ConnGroups 88. Each SubModel 86 will contain at least one CeliGroup 87. A SubModel 86 need not contain any ConnGroup 88.

Figure 13A:
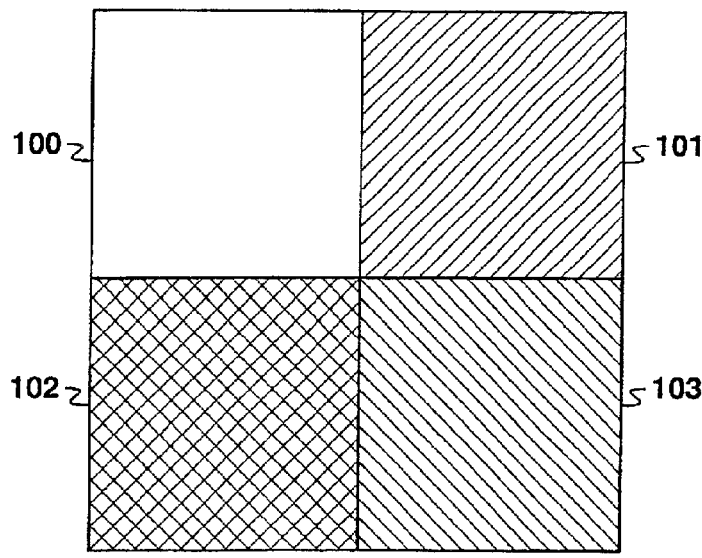
FIG. 13A shows a two-dimensional grid system that has been subdivided into four domains, which are numbered 100 through 103.

FIG. 13A illustrates a physical domain that is divided into four spatial domains 100, 101, 102, and 103. Each domain contains cell and connection data. In formulating reservoir simulation equations, three fundamental types of calculations are made: cell-only, connection-only, and cell-connection-cell. Cell-only and connection-only calculations can be self-contained and can be performed in parallel without sharing information. Cell-connection-cell calculations along a border between two domains require information from both domains. For example, pressure difference from one cell to another connected cell is a connection quantity and may be calculated as:

$$dp(\text{connection}) = p(\text{``left''  cell}) - p(\text{``right'' cell})$$

Cell data on both sides of the connection are needed, so this is a cell-connection-cell computation. The connection is assigned a "left" and a "right" side. Flow from left to right is designated to be positive. A cell-connection-cell computation such as this is conveniently performed by iterating over the connections in a connection-group. If cell data from one side of the connection is not contained in the current domain, the cell data must be obtained from a neighboring domain.

The discussion in the preceding paragraph assumes a k-orthogonal grid, since the only cells involved in the computation are the two that are connected. If a multipoint flux approximation is used, other neighboring cells can be involved in the computation. The connection-group must know what these other neighboring cells are for each of its connections, and it must contain other information as well. The extension of the present invention that would be required to include this additional information would be familiar to those skilled in the art in light of the teachings of this patent. Such an extension would introduce the possibility that a connection could involve more than two cell-groups. This means that, instead of there being at least one connection-group for each connected pair of cell-groups, there would be at least one multipoint flux approximation connection-group for each unique set of cell-groups involved in a connection calculation.

Based on these requirements, a domain can be divided into groups of cell data and connection data Certain connection calculations will require cell information from neighboring domains. For purposes of the example shown in FIG. 13A, it is assumed that there are connections only between domains 100 and 101, 100 and 102, 101 and 103, and 102 and 103, but no cell connections between domains 100 and 103 and between domains 102 and 101.

Figure 13B:
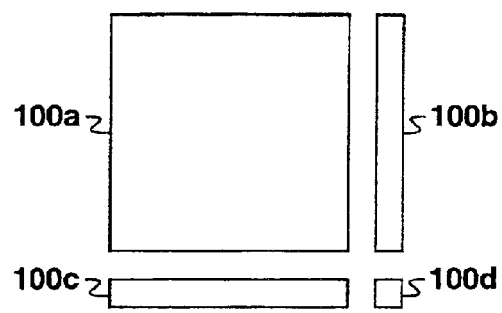
FIG. 13B illustrates four cell-groups that can be obtained from domain 100.
Figure 13C:
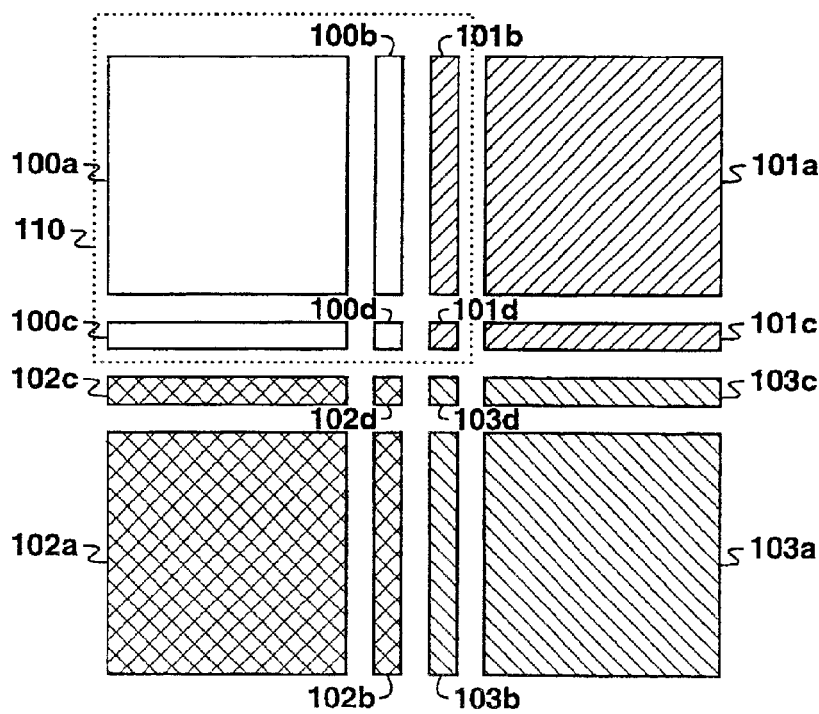
FIG. 13C illustrates cell-groups of domain 100 of FIG. 13B and cell-groups of domains 101, 102, and 103. Connection calculations in domain 100 involve cell-groups within the dashed line 110.

Within a domain, cells and connections are partitioned into distinct cell-groups. A cell-group consists of all the cells that are involved in the connection calculations for a particular set of domains. Domain 100 can be partitioned into four cell-groups 100a, 100b, 100c, and 100d, which are schematically illustrated in FIG. 13B. In domain 100 for example, cell-group 100a is a set of all cells that only have connections to other domain 100 cells. Cell-group 100b is the set of all cells that only have connections to domain 101 cells. Cell-group 100c is the set of all cells that only have connections to domain 102 cells. Cell-group 100d is the set of all cells that have connections to domains 101 and 102. A cell belongs only to one cell-group. FIG. 13C schematically illustrates four cell-groups for each of the four domains 100, 101, 102, and 103 (cell-groups 100a, 100b, 100c, 100d for domain 100; cell-groups 101a, 101b, 101c, 101d for domain 101; cell-groups 102a, 102b, 102c, 102d for domain 102; and cell-groups 103a, 103b, 103c, 103d for domain 103). Connection calculations in domain 100 involve all domain 100 cell-groups and some cell-groups from domains 101 and 102. Such cells-groups for domain 100 are shown in FIG. 13C within the dashed line 110.

Figure 13D:
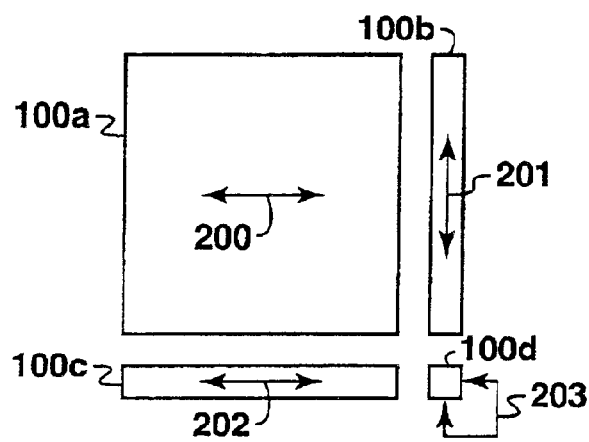
FIG. 13D illustrates cell-groups of domain 100 with arrows representing connection-groups that connect cells within cell-groups of domain 100.

For connection calculations within a domain, the connections are partitioned into a set of connection-groups. For each cell-group associated with a particular domain, there is a corresponding connection-group connecting cells in that cell-group to other cells in the same cell-group (assuming that such connections exist). For domain 100, is these can be depicted with arrows 200, 201, 202, and 203 as shown in FIG. 13D.

Figure 13E:
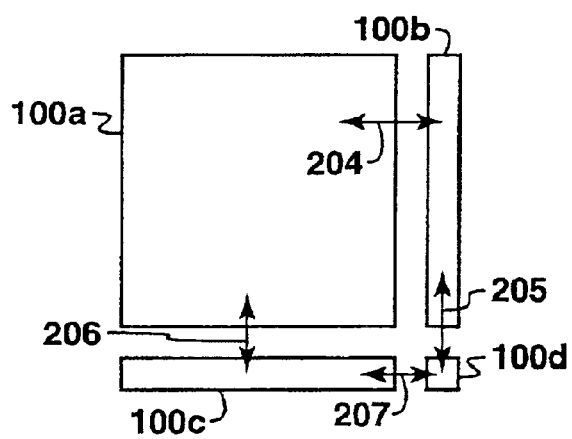
FIG. 13E illustrates cell-groups of domain 100 with arrows representing connection-groups that connect cells between cell-groups of domain 100.

Other connection-groups connect cells of one cell-group to cells of another cell-group as depicted with arrows 204, 205, 206, and 207 as shown in FIG. 13E.

Figure 13F:
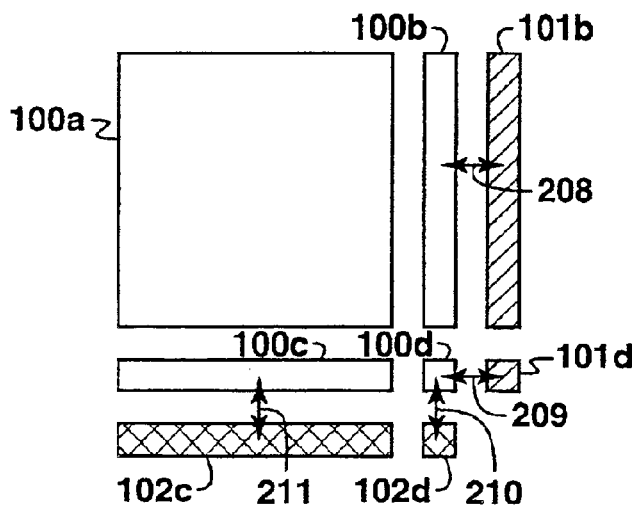
FIG. 13F illustrates cell-groups of domain 100 and cell-groups of domains 101 and 102 with arrows representing connection-groups that connect cells of domain 100 with cell-groups of domains 101 and 102.

Still additional connection-groups connect cell-groups of one domain to cell-groups of another domain. As depicted with arrows shown in FIG. 13F, cell-groups 100b and 101d of domain 100 are connected to cell-groups 101b and 101d of domain 101 as depicted by arrows 208 and 209 and cell-groups 100c and 100d of domain 100 are connected to cell-groups 102c and 102d of domain 102 as depicted by arrows 211 and 210.

The entire grid representing the domains of FIG. 13A could be represented by a Model 85 as illustrated in FIG. 12. The Model 85 would contain four SubModels 86, each of which would represent one of the four domains (100, 101, 102, and 103). The Model 85 would also contain eight ConnGroups 88: two connecting domain 100 to domain 101, two connecting domain 100 to domain 102, two connecting domain 101 to domain 103, and two connecting domain 102 to domain 103. Each SubModel 86 would contain four CellGroups. For domain 100, these subgroups are shown in FIG. 13B. Cells in group 100a are connected only to other cells in domain 100, cells in group 100b are connected to cells in domain 101 as well as to cells in domain 100, cells in 100c are connected to cells in domain 102 as well as to cells in domain 100, and cells in group 100d are connected to cells in domains 101 and 102 as well as to cells in domain 100. The cells in groups 100b, 100c, and 100d are those whose data will be needed by domains 101 and/or 102. Domain 100 will need data from analogous cell-groups in domains 101 and 102. These are the shaded cell-groups in FIG. 13F.

Figure 14:
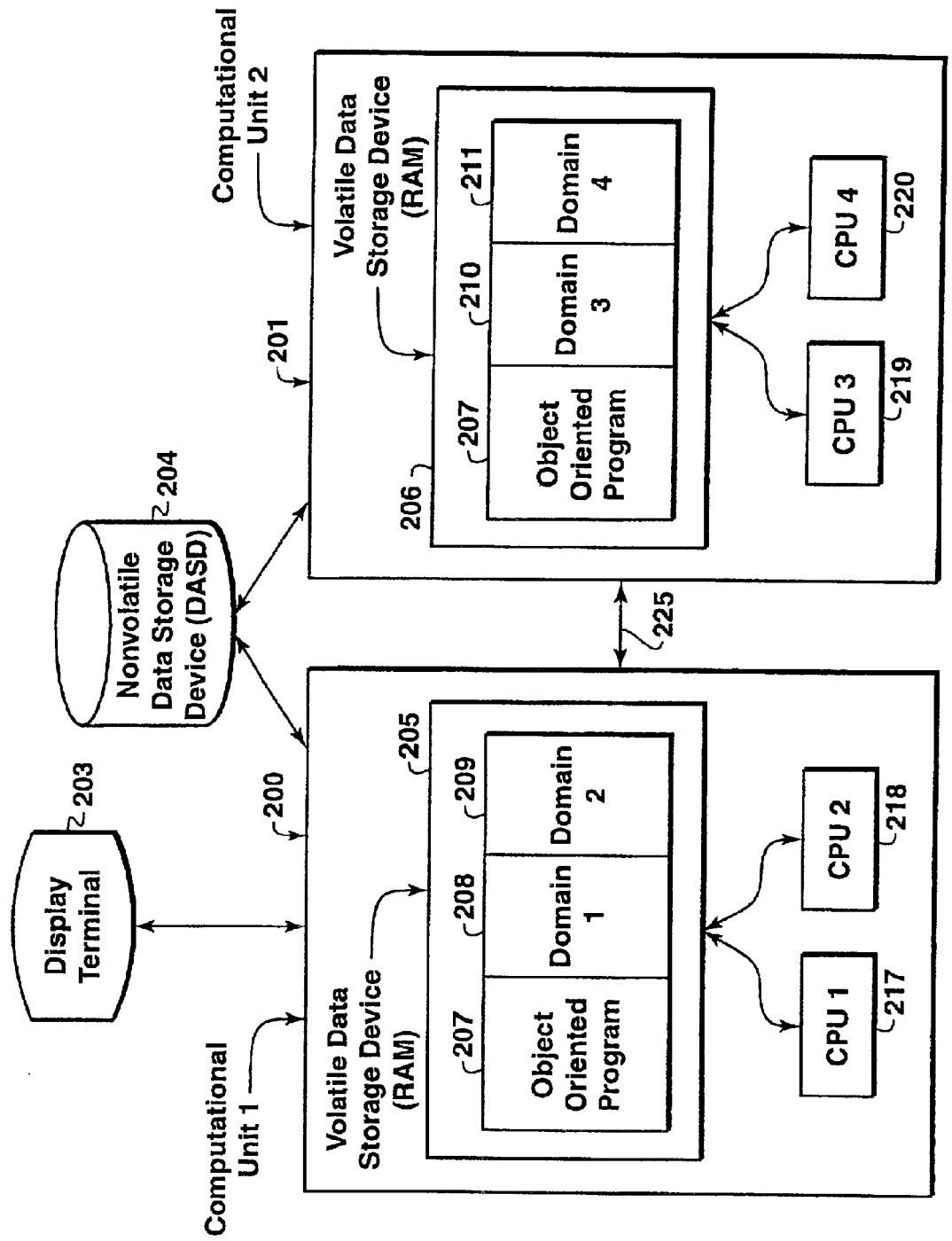
FIG. 14 is a high-level block diagram illustrating an example of a parallel computing system that uses object-oriented programming in the practice of the present invention.

FIG. 14 shows a schematic diagram of a hardware and software system in which present invention may operate. The system includes one or more computational units 200 and 201, a display terminal 203, and a nonvolatile data storage device 204. Each computational unit includes two volatile data storage devices 205 and 206, typically random access memory (RAM), for providing a working store for the objectoriented program 207 (which is installed in both computational units 205 and 206), active data, and intermediate results, and one or more central processing units (CPU's) for performing computations with respect to one or more domains. For illustration purposes only two computational domains 208 and 209 are shown for computational unit 200 and two computational domains 210 and 211 are shown for computational unit 201. In FIG. 14, two CPUs 217 and 218 are shown as being associated with computational unit 200 and two CPUs 219 and 220 are associated with computational unit 201. Computational units 200 and 201 may be a mainframe computer, minicomputer, workstation, or personal computer. When more than one computational unit is used in the present invention, the computational units are linked together by high-speed connections, which in FIG. 14 is symbolically represented by connection numbered 225. The nonvolatile data storage device 204 is used for permanent storage of the object-oriented program 207 and data. It normally will include a direct access storage device (DASD), and it may include a tape drive, erasable optical disk drive, or other well-known devices. The display terminal 203 can comprise a screen or other display and a keyboard.

The present invention can be implemented in software or in a combination of software and hardware. When implemented fully or partially in software, the invention can reside, permanently or temporarily, on any memory or storage medium, including but not limited to RAM, read-only memory (ROM), a disk or disks, an application-specific integrated circuit (ASIC), a programmable read-only memory (PROM), or the like.

The principle of the invention and the best mode contemplated for applying that principle have been described. It will be apparent to those skilled in the art that various changes may be made to the embodiments described above without departing from the spirit and scope of this invention as defined in the following claims. It is, therefore, to be understood that this invention is not limited to the specific details shown and described.

What is claimed is:

1. A method of predicting a property of at least one fluid in a fluid-containing physical system using an objectoriented program, said method comprises developing classes of simulation objects, said classes of simulation objects comprising cell-group objects and connection-group objects, and running the program in a computer to determine a property of at least one fluid in the physical system as a function of time.

2. The method of claim 1 wherein the physical system comprises a hydrocarbon-bearing subterranean formation.

3. The method of claim 1 wherein the physical system comprises fluid-containing facilities associated with production of hydrocarbons from a subterranean hydrocarbon-bearing formation.

4. The method of claim 1 wherein the physical system is represented by a single model object.

5. The method of claim 4 in wherein the physical system is represented by a plurality of submodel objects, each submodel object representing a portion of the physical system.

6. The method of claim 1 wherein all cells of a cell-group have common characteristics.

7. The method of claim 1 wherein all transport phenomena for all connections of a connection-group are treated as being the same.

8. The method of claim 1 wherein the physical system is divided into multiple domains and the program comprises cell-group objects and connection-group objects associated with cells and connections within each domain and connection-group objects associated with connections between cells of one domain and cells of another domain.

9. The method of claim 1 wherein the cells arc in an unstructured grid.

10. The method of claim 1 wherein a cell of the multiplicity of cells belongs only to one cell-group object.

11. The method of claim 1 wherein the cells are PEBI grid cells.

12. The method of claim 1 wherein the cells are three-dimensional.

13. The method of claim 1 wherein the grid of cells is unstructured areally and structured vertically.

14. The method of claim 1 further comprises running the program on a plurality of computational units that are linked together.

15. The method of claim 1 further comprises running the program on a plurality of domains using a plurality of CPUs.

16. A method of simulating a characteristic of a complex system using an object-oriented program, comprising the steps of:
(a) discretizing the physical system into a plurality of volumetric cells;
(b) generating a plurality of connections representative of a cell-to-cell transport phenomenon;
(c) generating a multiplicity of objects to define the complex system, said objects comprising cell-groups and connection-groups; and
(d) using the objects in an object-oriented simulation program to simulate a characteristic of the complex system.

17. A method for simulating fluid flow in a hydrocarbon-bearing reservoir and its associated wells and facilities, said method comprising
(a) discretizing the hydrocarbon-bearing reservoir and its associated wells and facilities into a plurality of volumentric cells;
(b) forming said volumetric cells into groups based on selected characteristics of the cells;
(c) constructing a cell-group object associated with each said group of cells, said cell-group object containing information required by its associated group of cells;
(d) defining connections through which fluid can flow and energy can be transported between pairs of said cells;
(e) assembling sets of equations governing fluid flow and energy transport through the said connections between pairs of cells;
(f) forming said connections between pairs of cells into groups, each group connecting a pair of cell-group objects;
(g) constructing a connection-group object associated with each said group of connections, said connection-group object containing information required by its associated group of connections;
(h) simulating fluid flow and energy transport by using said cell-group objects and connection-group objects to compute properties of fluids contained in each cell and to compute flow of fluids and transport of energy through connections; and
(i) using the simulation results of step (h) to simulate fluid flow in the hydrocarbon-bearing reservoir and its associated wells and facilities.

18. The method of claim 17 wherein the cells are PEBI grid cells.

19. The method of claim 17 wherein the cells are three-dimensional.

20. The method of claim 17 wherein the cells form a cell-grid that is unstructured areally and structured vertically.

21. A method for simulating fluid flow in a hydrocarbon-bearing reservoir and its associated wells and facilities, said method comprising
(a) discretizing the hydrocarbon-bearing reservoir and its associated wells and facilities into a plurality of volumetric cells;
(b) forming said volumetric cells into domains;
(c) forming said volumetric cells within each domain into groups based on selected characteristics of the cells;
(d) constructing a ceu-group object associated with each said group of cells, said cell-group object containing information required by its associated group of cells;
(e) defining connections through which fluid can flow and energy can be transported between pairs of said cells;
(f) assembling sets of equations governing fluid flow and energy transport through the said connections between pairs of cells;
(g) forming said connections between pairs of cells into groups, each group connecting a pair of cell-group objects;
(h) constructing a connection-group object associated with each said group of connections, said connection-group object containing information required by its associated group of connections;
(i) constructing a submodel object associated with each domain of volumetric cells, said submodel object containing the cell-groups belonging to the domain and the connection-groups that either (1) connect cells in a particular cell-group belonging to the domain to other cells in the same cell-group, or (2) connect cells in a particular cell-group belonging to the domain to cells in another cell-group belonging to the domain;
(j) constructing a model object containing (1) the said submodel objects and (2) the connection-group objects that connect cells in a particular submodel object to cells in another submodel object;
(k) simulating fluid flow and energy transport using said cell-group, connection-group, submodel, and model objects to compute properties of fluids contained in each cell, to compute flow of fluids and transport of energy through connections; and (l) using the simulation results of step (k) to simulate fluid flow in the hydrocarbon-bearing reservoir and its associated wells and facilities.

22. The method of claim 21 wherein the cells are PEBI grid cells.

23. The method of claim 22 wherein the grid of cells is unstructured areally and structured vertically.

24. The method of claim 21 wherein the cells are three-dimensional.

25. A computer-implemented method of simulating a time-varying property of at least one fluid in a fluid-containing physical system, comprising the steps of:
   (a) receiving and storing in a computer memory a list of objects, at least some of the objects representing a multiplicity of cell-groups and a multiplicity of connection-groups;
   (b) for a specified simulation time period, using said objects in a simulator to simulate a property of at least one fluid in the physical system; and (c) generating output data representing values of said time-varying property.

26. A computer-readable media tangibly embodying a program of instructions executable by a computer to perform a method of predicting a property of at least one fluid in a fluid-containing physical system using object-oriented programming, said method comprising using cell-group objects and connection-group objects.

27. The computer-readable media of claim 26 wherein the media comprise at least one of a RAM, a ROM, a disk, an ASIC, and PROM.

28. A computer system for performing simulations using an object-oriented program to predict a property of at least one fluid in a fluid-containing physical system, the system compromising
   (a) a central processing unit (CPU);
   (b) a user interface, which includes means for supporting user selection of simulation parameters at run time;
   (c) a memory store for storing data and object-oriented program code, coupled to the CPU to facilitate execution of the program code stored therein, the memory store storing a set of objects, said objects comprising a plurality of cell-groups and a plurality of connection-groups, and the object-oriented program; and
   (d) means for performing a simulation to predict a property of at least one fluid using the set of objects.

29. A system as recited in claim 28 wherein the set of simulation objects is organized into classes.

30. A system as recited in claim 29 wherein the classes comprise a model and one or more submodels.

31. A system as recited in claim 30 wherein the classes further comprise one or more cell-groups and one or more connection groups.

* * * * *